(12) United States Patent
Fowler et al.

(10) Patent No.: US 12,366,389 B2
(45) Date of Patent: *Jul. 22, 2025

(54) THERMAL REGULATION SYSTEM

(71) Applicant: Gobi Technologies Inc., Kirkland, WA (US)

(72) Inventors: Lawrence Morgan Fowler, Kirkland, WA (US); Victoria E. H. Ellington, London, KY (US); Peter Maier-Laxhuber, Pfaffenhofen an der Ilm (DE); Ivan Poleshchuk, Riemerling (DE); Reiner Wörz, Reichertshausen (DE); Ralf Schmidt, Freising (DE)

(73) Assignee: Gobi Technologies Inc., Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/624,845

(22) Filed: Apr. 2, 2024

(65) Prior Publication Data

US 2024/0361051 A1 Oct. 31, 2024

Related U.S. Application Data

(63) Continuation of application No. 18/213,510, filed on Jun. 23, 2023, now abandoned, which is a
(Continued)

(51) Int. Cl.
*F25B 30/04* (2006.01)
*F25B 17/08* (2006.01)

(52) U.S. Cl.
CPC ............. *F25B 30/04* (2013.01); *F25B 17/08* (2013.01); *F25B 2315/006* (2013.01);
(Continued)

(58) Field of Classification Search
CPC .... F25B 30/04; F25B 17/08; F25B 2315/006; F25B 2400/00; F25B 2600/2519; F25B 2700/21161
(Continued)

(56) References Cited

U.S. PATENT DOCUMENTS 2,293,556 A 8/1942 Newton
4,759,191 A * 7/1988 Thomas ................. F25B 17/08
62/480
(Continued)

FOREIGN PATENT DOCUMENTS

EP 2978683 A1 2/2016
JP S6037775 U 3/1985
(Continued)

OTHER PUBLICATIONS

U.S. Appl. No. 18/213,510, filed Jun. 23, 2023.
(Continued)

*Primary Examiner* — Steve S Tanenbaum
(74) *Attorney, Agent, or Firm* — George C. Rondeau, Jr.; Davis Wright Tremaine LLP

(57) ABSTRACT

A sorption heat pump having an evaporator containing a working fluid to evaporate the fluid to produce a gas, a sorber containing a sorption material to sorb the gas during a sorption phase, a vapor pathway connecting the evaporator and sorber, and a thermal control unit controlling the rate of vapor flow between the evaporator and sorber through the pathway, and being selectively operable to permit, stop and restart the flow of gas through the pathway. The pump may be used with a compartment storing temperature sensitive material. The evaporator may be positioned inside and the sorber outside the compartment, or the sorber may be positioned inside and the evaporator outside the compartment. The pump may be used in an apparatus including both
(Continued)

cool and warm compartments, with an insulation layer in each. A method is disclosed for reusing the pump after the sorption material has been sorbed.

27 Claims, 20 Drawing Sheets

Related U.S. Application Data continuation of application No. 16/888,483, filed on May 29, 2020, now Pat. No. 11,732,935.

(60) Provisional application No. 62/936,942, filed on Nov. 18, 2019, provisional application No. 62/855,626, filed on May 31, 2019.

(52) U.S. Cl.
CPC ... *F25B 2400/00* (2013.01); *F25B 2600/2519* (2013.01); *F25B 2700/21161* (2013.01)

(58) Field of Classification Search
USPC .......................................................... 62/104
See application file for complete search history.

(56) References Cited

U.S. PATENT DOCUMENTS

| | | | |
|---|---|---|---|
| 5,038,581 A | | 8/1991 | Maier-Laxhuber et al. |
| 5,050,403 A | | 9/1991 | Maier-Laxhuber |
| 5,054,544 A | | 10/1991 | Maier-Laxhuber et al. |
| 5,059,567 A | | 10/1991 | Linsten et al. |
| 5,197,712 A | | 3/1993 | Engelhardt |
| 5,207,073 A | * | 5/1993 | Maier-Laxhuber ....... F25C 1/16 62/169 |
| 5,291,942 A | | 3/1994 | Ryan |
| 5,359,861 A | | 11/1994 | Maier-Laxhuber et al. |
| 5,404,728 A | | 4/1995 | Maier-Laxhuber |
| 5,415,012 A | | 5/1995 | Maier-Laxhuber et al. |
| 5,482,541 A | | 1/1996 | Maier-Laxhuber et al. |
| 5,494,410 A | | 2/1996 | Maier-Laxhuber et al. |
| 5,518,069 A | * | 5/1996 | Maier-Laxhuber ..... F25B 17/08 62/480 |
| 5,585,145 A | | 12/1996 | Maier-Laxhuber et al. |
| 5,675,982 A | | 10/1997 | Kirol et al. |
| 6,349,560 B1 | | 2/2002 | Maier-Laxhuber et al. |
| 6,378,326 B2 | | 4/2002 | Maier-Laxhuber et al. |
| 6,412,295 B2 | | 7/2002 | Weiss et al. |
| 6,474,100 B1 | | 11/2002 | Smith et al. |
| 6,623,648 B2 | | 9/2003 | Lee |
| 6,820,441 B2 | | 11/2004 | Maier-Laxhuber et al. |
| 7,213,403 B2 | | 5/2007 | Maier-Laxhuber et al. |
| 7,213,411 B2 | | 5/2007 | Maier-Laxhuber et al. |
| 7,726,139 B2 | | 6/2010 | Maier-Laxhuber |
| 8,074,470 B2 | | 12/2011 | Maier-Laxhuber et al. |
| 9,140,476 B2 | | 9/2015 | Eckhoff et al. |
| 9,170,053 B2 | | 10/2015 | Eckhoff et al. |
| 9,657,982 B2 | | 5/2017 | Chou et al. |
| 9,902,977 B2 | | 2/2018 | Lim et al. |
| 10,203,137 B2 | | 2/2019 | Burk |
| 11,732,935 B2 | * | 8/2023 | Fowler .................... F25B 30/04 62/104 |
| 2004/0211215 A1 | | 10/2004 | Maier-Laxhuber et al. |
| 2004/0231346 A1 | | 11/2004 | Smith et al. |
| 2006/0191287 A1 | | 8/2006 | Maier-Laxhuber |
| 2008/0276486 A1 | | 11/2008 | Eichholz et al. |
| 2008/0314070 A1 | | 12/2008 | Maier-Laxhuber et al. |
| 2009/0222220 A1 | | 9/2009 | Wilke |
| 2012/0000220 A1 | | 1/2012 | Altay |
| 2013/0276475 A1 | | 10/2013 | Aso et al. |
| 2013/0306656 A1 | | 11/2013 | Eckhoff et al. |
| 2014/0290293 A1 | * | 10/2014 | Eckhoff ................ F25B 49/046 62/271 |
| 2015/0027157 A1 | | 1/2015 | Chou et al. |
| 2016/0084577 A1 | | 3/2016 | Chou et al. |
| 2017/0198960 A1 | * | 7/2017 | Chou .................... B65D 81/38 |
| 2019/0170418 A1 | | 6/2019 | Barot et al. |
| 2020/0378656 A1 | | 12/2020 | Fowler et al. |

FOREIGN PATENT DOCUMENTS

| | | |
|---|---|---|
| JP | 2003004297 A | 1/2003 |
| JP | 2004085109 A | 3/2004 |
| JP | 2004150792 A | 5/2004 |
| JP | 2004233039 A | 8/2004 |
| JP | 2005514580 A | 5/2005 |
| JP | 2008215808 A | 9/2008 |
| JP | 2009002642 A | 1/2009 |
| JP | 2015183931 A | 10/2015 |
| JP | 2016514824 A | 5/2016 |
| JP | 2016516973 A | 6/2016 |
| JP | 2018531357 A | 10/2018 |
| KR | 20040081288 A | 9/2004 |
| KR | 20110073381 A | 6/2011 |
| WO | 2013153517 A2 | 10/2013 |
| WO | 2014160833 A1 | 10/2014 |

OTHER PUBLICATIONS

U.S. Appl. No. 17/330,165, filed May 25, 2021.
U.S. Appl. No. 17/404,731, filed Aug. 17, 2021.
U.S. Appl. No. 18/220,745, filed Jul. 11, 2023.
Extended European Search Report for Application No. 20813098.9, mailed Mar. 10, 2023, 10 pages.
International Search Report and Written Opinion for Application No. PCT/US2021/034094, mailed Sep. 14, 2021, filed May 25, 2021, 9 pages.
Partial European Search Report for Application No. 20813098.9, mailed Dec. 5, 2022, 13 pages.

\* cited by examiner

Opened

Closed

Opened

Closed

THERMAL REGULATION SYSTEM

BACKGROUND OF THE INVENTION

Field of the Invention

The present invention is directed generally to a system, device, and method for thermal regulation.

Description of the Related Art

One example of a thermal regulation system is a sorption heat pump. The sorption heat pump is a device that moves heat from one place to another by vaporizing a working material, also known as a working fluid, in one location (the evaporator) and sorbing the working material to a sorption material in a different location (the sorber). The evaporator and the sorber are connected by a vapor pathway. The evaporation of the working fluid into a working fluid gas in the evaporator requires the input of heat energy, thereby cooling the evaporator. The sorption of the working material in the sorber releases heat energy, thereby heating the sorber.

DETAILED DESCRIPTION OF THE INVENTION

Specific details of certain embodiments of the invention are set forth in the following description and in the figures to provide a thorough understanding of such embodiments.

The present invention may have additional embodiments, may be practiced without one or more of the details described for any particular described embodiment, or may have any detail described for one particular embodiment practiced with any other detail described for another embodiment.

As used herein and unless otherwise indicated, the terms "a" and "an" are taken to mean "one", "at least one" or "one or more." Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to." Words using the singular or plural number also include the plural and singular number, respectively. Additionally, the words "herein," "above," and "below" and words of similar import, when used in this application, shall refer to this application as a whole and not to any particular portions of the application.

One embodiment of the invention is a system capable of maintaining a regulated temperature or heat transfer rate using a sorption heat pump system, and in some embodiments, a phase change material (PCM) buffer. In some embodiments, the sorption heat pump system can have a valve to control the vapor flow in which the valve is independent of temperature (for example, an on/off switch). In some embodiments, the sorption heat pump system can have a thermostat to control vapor flow, in which the thermostat controls vapor flow in response to temperature.

Figure 1:
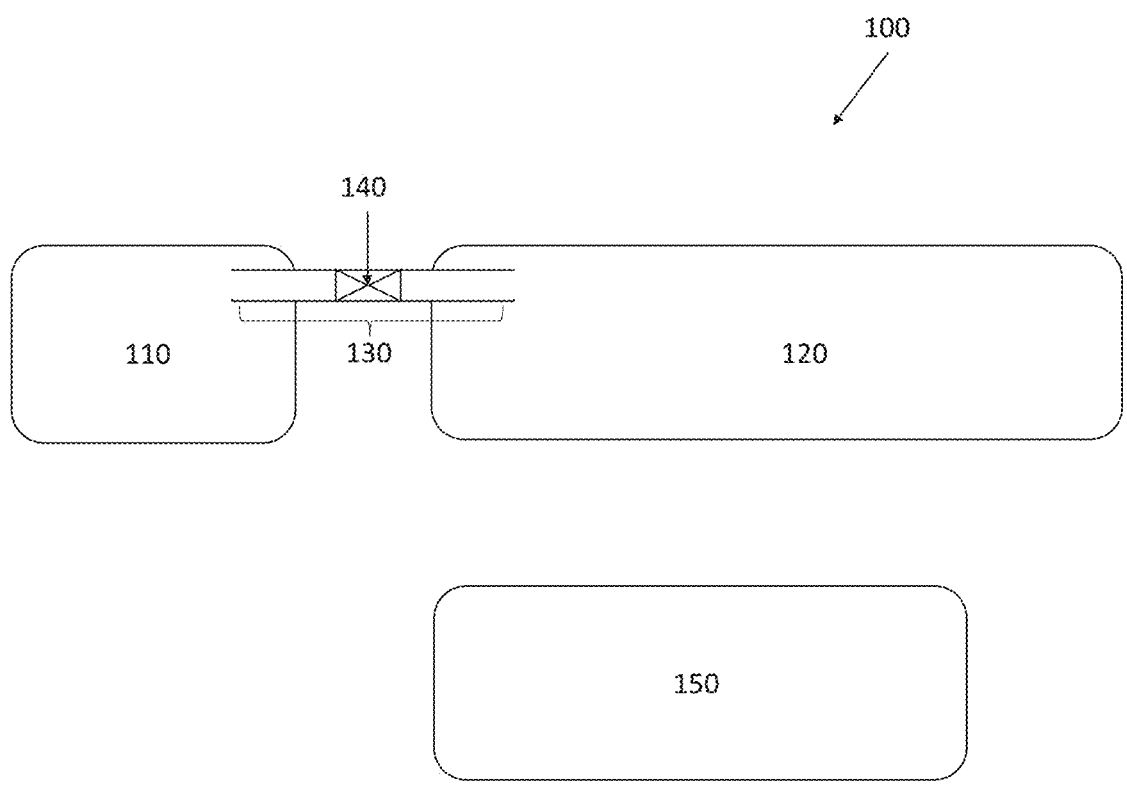
FIG. 1 is a schematic drawing of a sorption heat pump system and a phase change material buffer.

As noted above, the sorption heat pump system 100 shown in FIG. 1 is a device that moves heat from one place to another by vaporizing a working material in one location (an evaporator 120) and sorbing the working material to a sorption material in a different location (a sorber 110). The evaporator 120 and the sorber 110 are connected by a vapor pathway 130. The evaporation of the working material in the evaporator 120 requires the input of heat energy, thereby cooling the evaporator. The sorption of the working material in the sorber 110 releases heat energy, thereby heating the sorber. There are many working material/sorber pairs known. For example, an especially effective pair of materials is water as the working material and zeolite as the sorption material. With this water/zeolite pair, cooling and heating rates in excess of 100 Watts can be achieved by evacuating the air out of the sorption heat pump to a pressure level of less than 10 mbar, for example. The water then evaporates in the evaporator 120 at lower temperatures due to the lower pressure and the sorber 110 sorbs the water vapor. The precise evaporation temperature of the water in the evaporator 120 can be controlled by controlling the pressure in the evaporator 120. The pressure can be controlled by means of a thermal control unit 140 (e.g., a valve or thermostat) between the evaporator 120 and the sorber 110 which controls the rate of vapor flow between the evaporator and the sorber. Likewise, the temperature in the sorber can be controlled by controlling the rate of vapor flow into the sorber by means of the thermal control unit 140. In this way, the rate of heat transfer from one side to another can be started, stopped and controlled. For example, the thermal control unit 140 can control the temperature of the sorber by a thermostat. For example, the thermal control unit 140 can control the temperature of the sorber in a manner that is independent of temperature, such as with an on/off valve.

In some embodiments, the sorption heat pump system is reversible, or "chargeable." This means that the working material can be desorbed from the sorption material, typically by heating the sorption material. The heating of the sorption material can be accomplished in many ways, for example, through the sorber being placed in an oven or toaster-like appliance. Another type of heater is a built-in heating system that heats the sorber 110 from the inside. The working material then desorbs from the sorption material and condenses in the evaporator, or in a compartment between the sorber and the evaporator. The sorption heat pump may then be used again. The sorption heat pump system can be "charged" and then stored with no energy input needed before being used as a heat transfer system at a later time.

The sorption heat pump system can be composed of any number of evaporator sections and sorber sections. In some embodiments, the sorption heat pump system 100 is composed of two sections: the evaporator 120 and the sorber 110. These two sections can be joined by the vapor pathway 130 through which heat is transferred by a vapor. The vapor pathway can have a thermal control unit 140 such as a valve or other vapor control mechanism that can be opened or closed variably to allow vapor to flow through or to slow or halt the flow of vapor. When the valve is open, the vapor evaporates in the evaporator 120 and is adsorbed or absorbed in the sorber 110, thereby transferring heat from the evaporator section to the sorber section.

A phase change material, known as PCM, is a material that changes phase at a specific temperature or temperature range. One example of a basic phase change material is water, which changes from a liquid to a solid at 0 degrees Celsius ("C"). Other types of phase change materials exist that change phase at various temperatures, for example 5° C. or 80° C. A key property of the PCM is that the material has a significant amount of latent heat at the phase change temperature. This means that the PCM can act as a thermal battery or buffer and release or absorb heat at its phase change temperature. The PCM can thereby serve as a thermal buffer between two or more areas of different temperatures.

Figure 14:
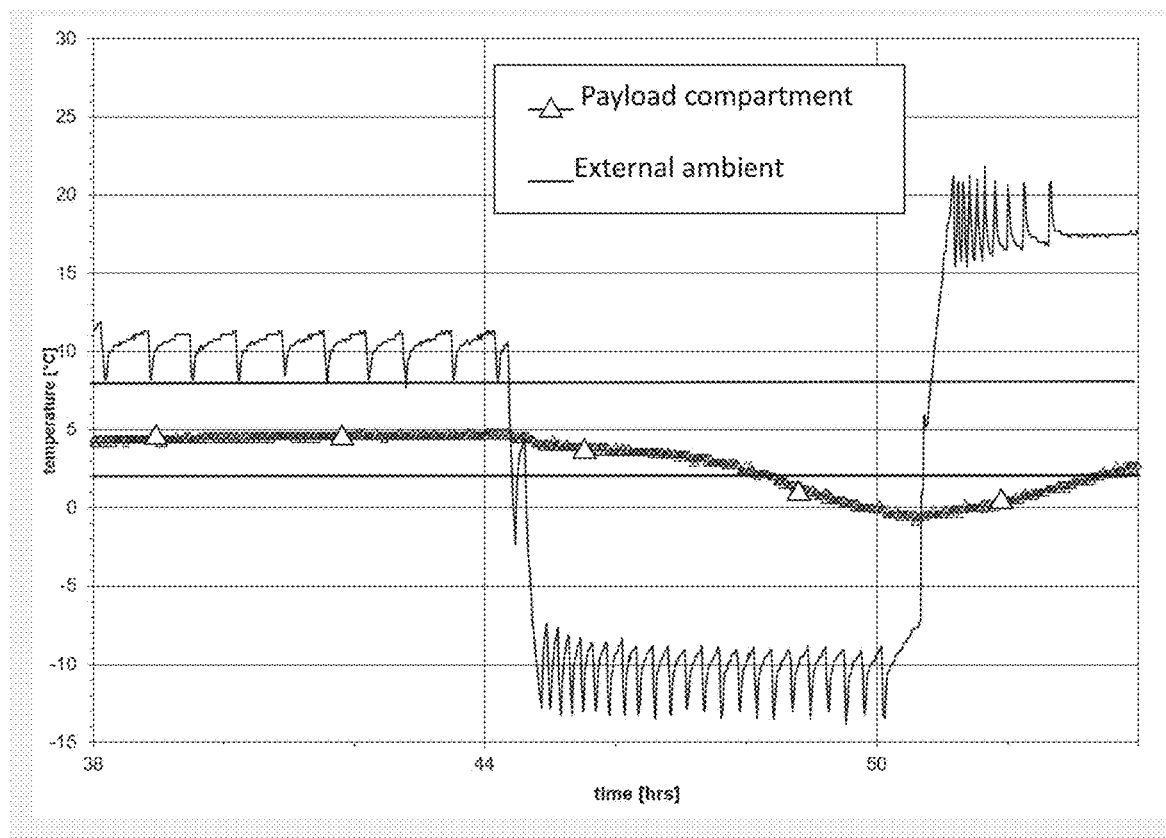
FIG. 14 is a graph of thermal performance of a first example temperature-controlled container using a sorption heat pump, phase change material buffers and a heat pipe heater.
Figure 15:
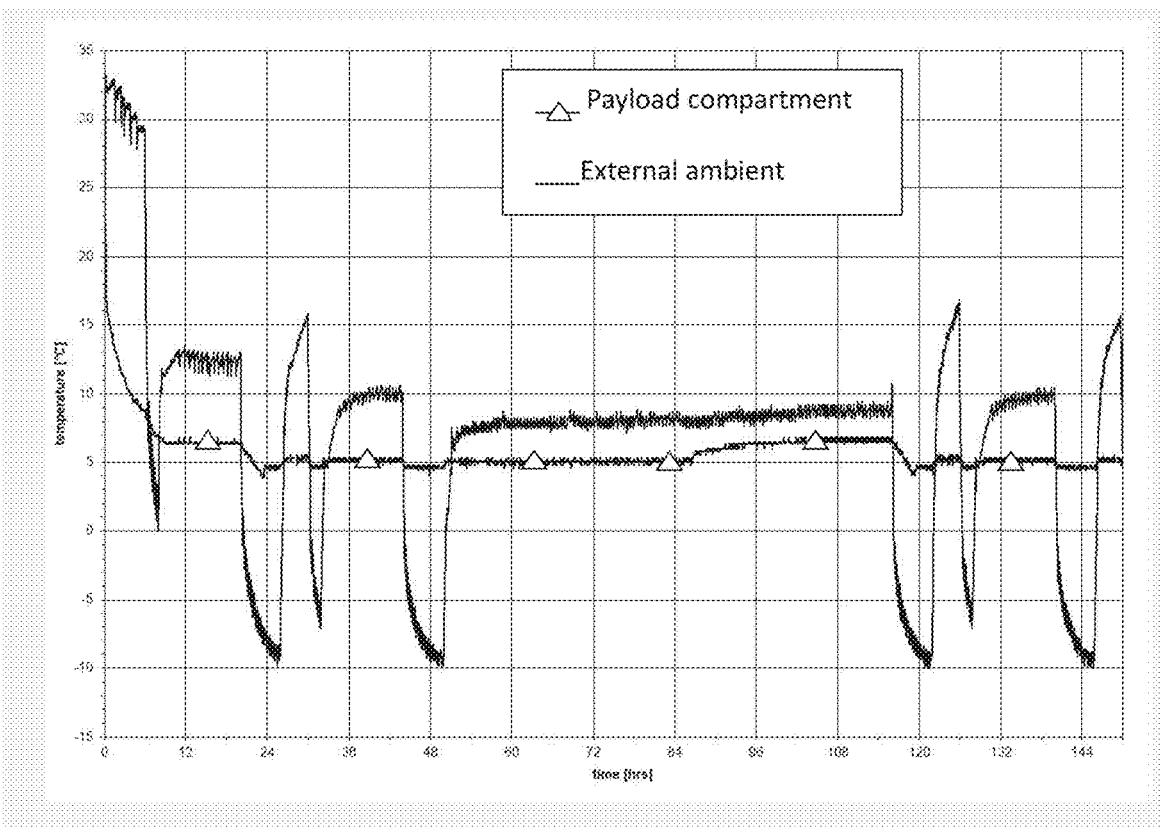
FIG. 15 is a graph of thermal performance of a second example temperature-controlled container using a sorption heat pump, phase change material buffers and a heat pipe heater.
Figure 16:
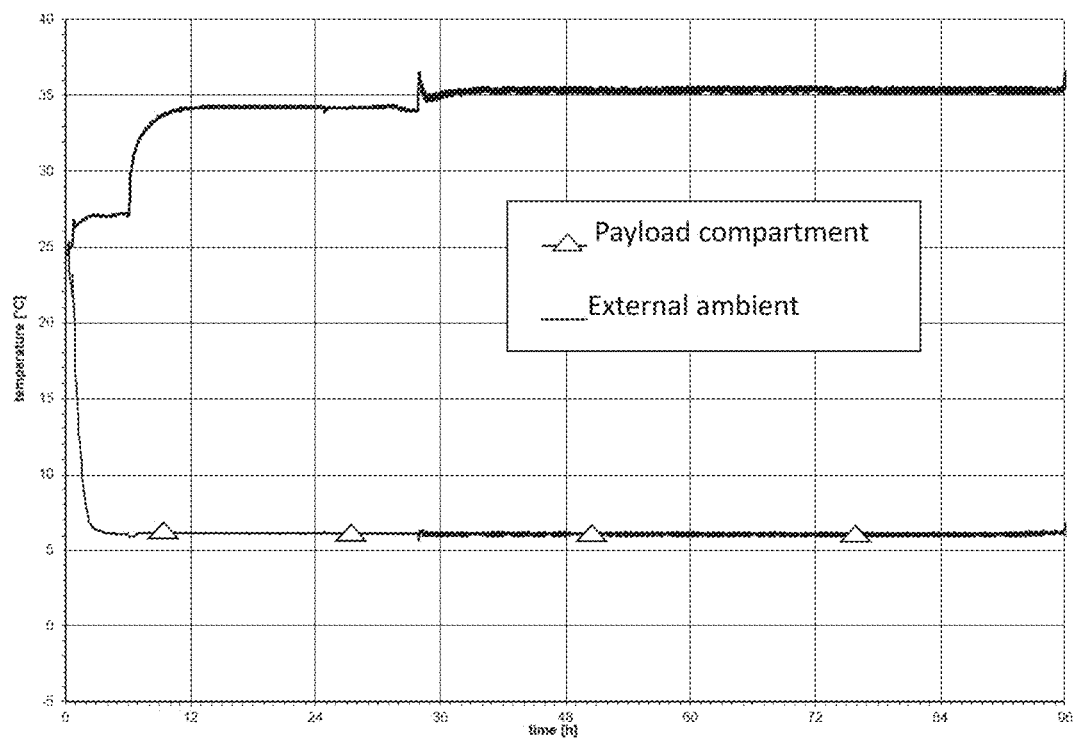
FIG. 16 is a graph of thermal performance of a third example temperature-controlled container using a sorption heat pump, phase change material buffers and a heat pipe heater.
Figure 17:
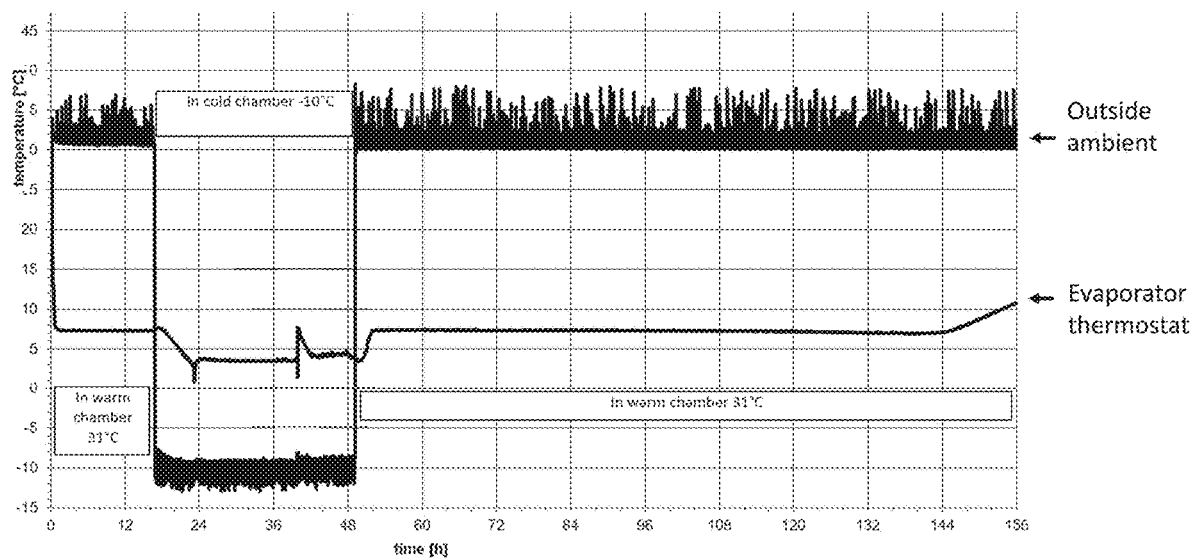
FIG. 17 is a graph of thermal performance of a fourth example temperature-controlled container using a sorption heat pump, phase change material buffers and a heat pipe heater.

In some embodiments, the properties of the sorption heat pump system 100 and a PCM buffer 150 are combined to create an integral, shelf-stable thermal regulation system that does not require any external energy input during heating or cooling. The system can be used to maintain a compartment within a predetermined temperature range, even with varying external temperatures, without any external inputs. FIGS. 14-17 show prototype temperature data from such a system. In FIGS. 14-17, the desired payload compartment temperature is 2-8° C. In FIG. 14, the payload compartment drops below 2° C. when the external ambient is below 0° C. because the PCM buffer 150 is not in place. In FIG. 15, the payload compartment does not drop below 4° C. even when the external ambient temperature is below 0° C. because the PCM buffer 150 and the evaporator 120 work together as a heat pipe to distribute the heat within a payload compartment 210 (for example, see compartment in FIG. 2). In FIG. 16, the payload compartment 210 stays under 7° C. even when the external ambient is 35° C. In FIG. 17, the payload compartment 210 stays between 2° C. and 8° C. at ambient temperature as low as −10° C. and as high as 31° C.

In some embodiments, such a system that combines a sorption heat pump and phase change material can be used to keep a compartment or item cold or hot. For example, to keep something cold, the evaporator side of a sorption heat pump system may reach −15° C. If the desire is to maintain the cool side temperature at 5° C., a 5° C. PCM could be added to the system such that the PCM absorbs any excess energy between 5° C. and −15° C. from the evaporator.

The invention, in some embodiments, is a system that can regulate temperature using the sorption heat pump 100 and the phase change material PCM buffer 150. The PCM buffer can be used in multiple ways. One option is to maintain the desired internal temperature of a compartment by absorbing and/or releasing energy from or into a heat pump. Another option is to maintain the desired internal compartment temperature by absorbing and/or releasing energy from or into the exterior environment.

Figure 2:
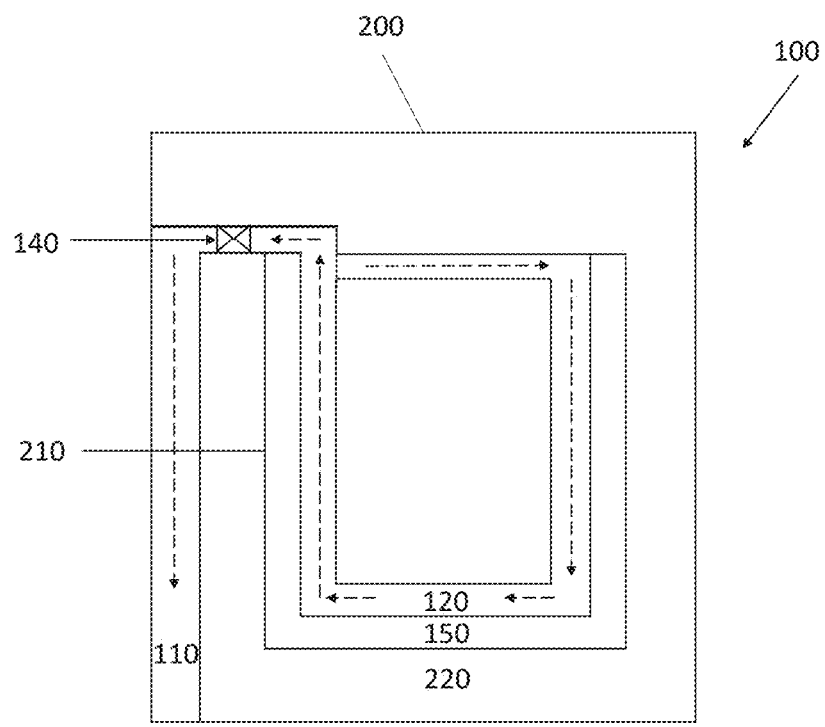
FIG. 2 is a schematic cross section drawing of a temperature-controlled container with a thermal regulation system in cooling configuration using a sorption heat pump and a phase change material buffer.

In FIG. 2, the sorption heat pump system 100 and the phase change material PCM buffer 150 are integrated into a thermal regulation system in a temperature-controlled container 200. FIG. 2 shows a system in which the payload compartment 210 is maintained at a temperature cooler than the ambient outside temperature surrounding the temperature-controlled container 200. The evaporator 120 and the phase change material buffer 150 are both situated inside an insulation layer 220. A preferred embodiment is where the phase change material buffer 150 is positioned between the evaporator 120 and the inward payload compartment 210 wall. The sorber 110 is situated outside the insulation layer 220. The phase change material PCM buffer 150 has a high specific energy density (for example, it can be a material with a phase transition at 5° C. with a thermal storage capacity of 200-250 J/g). In the preferred embodiments, the temperature-controlled container 200 may be positioned inside an outer carton. In this case, the outer carton should be vented in the area near the sorber 110 to assist with heat rejection from the sorber to the environment.

Figure 3:
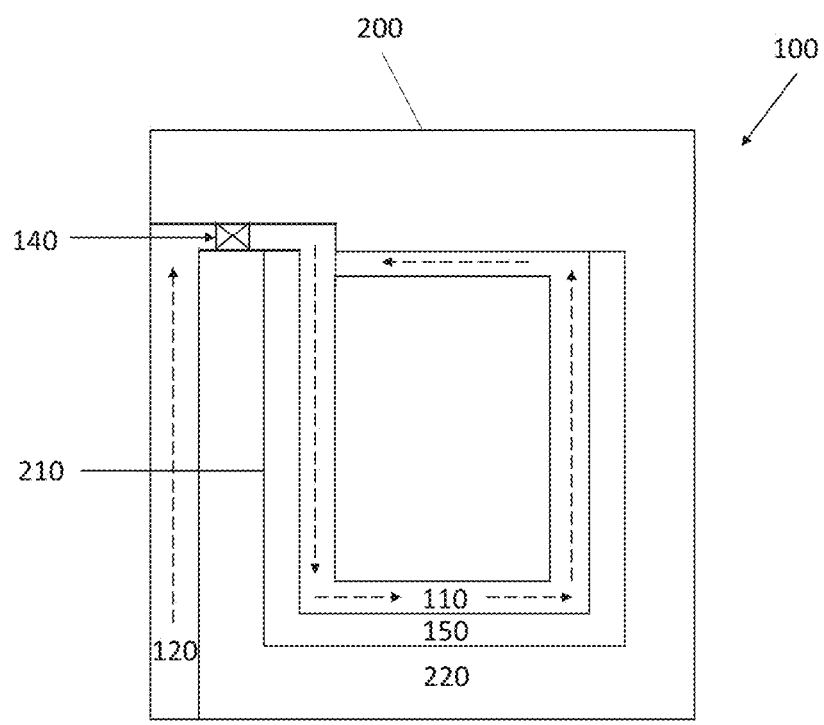
FIG. 3 is a schematic cross section drawing of a temperature-controlled container with a thermal regulation system in heating configuration using a sorption heat pump and a phase change material buffer.

Another embodiment of the invention, shown in FIG. 3, has the payload compartment 210 temperature kept at a temperature warmer than the surrounding ambient temperature outside the temperature-controlled container 200. This is possible by changing the orientation of the evaporator 120 and sorber 110. For the payload compartment 210 to be kept warm, the evaporator 120 is placed exterior of the insulation layer 220 and the sorber 110 is situated interior of the insulation layer 220. This allows transfer of heat from outside the payload compartment 210 to inside the payload compartment 210. The phase change material PCM buffer 150 stores a significant amount of energy at higher temperatures (for example, an 80° C. phase change material with a thermal storage capacity of 220 J/g).

Figure 4:
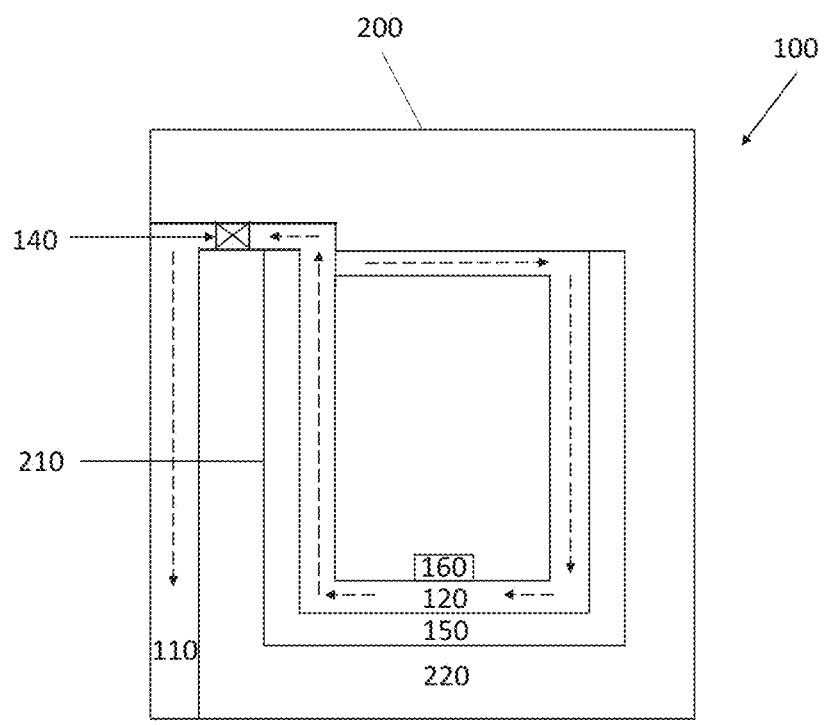
FIG. 4 is a schematic cross section drawing of a temperature-controlled container with a thermal regulation system in universal configuration using a sorption heat pump, a phase change material buffer, and a heat pipe heater.

An additional embodiment of the invention is shown in FIG. 4. This embodiment comprises a temperature-controlled container 200 that cools the payload compartment 210 when the outside ambient temperature is hotter than the desired payload compartment temperature while also heating the payload compartment 210 when the outside ambient temperature is lower than the desired payload compartment temperature range. This can be achieved by the evaporator 120 and the phase change material PCM buffer 150 both being placed interior of the insulation layer 220 while the sorber 110 is placed exterior of the insulation layer 220. In the cooling mode, the thermal control unit 140 of the sorption heat pump system 100 is set to maintain a temperature range inside the payload compartment 210 by regulating the amount of vapor transferred (and therefore the amount of cooling) from the evaporator 120 to the sorber 110, for example by means of a thermostat. When the outside ambient temperature drops below the desired payload compartment temperature range, the thermal control unit 140 stops the flow of vapor, thereby effectively stopping the transfer of heat through vapor from the inside of the payload compartment 210 to the outside of the compartment. The system then enters a passive heating mode. In passive heating mode, the phase change material PCM buffer 150 begins to freeze, which releases its latent heat into the payload compartment 210. This latent heat then maintains the payload compartment temperature within the desired range until the PCM buffer is completely frozen. In very cold ambient temperatures, the phase change material PCM buffer 150 can be replaced or augmented by a different heat source, such as a heat pipe heater 160. The heat pipe heater 160 is integrated with the evaporator 120 so that a heat pipe effect distributes heat from the heat pipe heater 160 throughout the evaporator 120. For example, if the desired payload compartment temperature is 2-8° C. at ambient temperatures ranging from −10° C. to 35° C., the sorption heat pump system can be used to cool the compartment to the desired range when the ambient temperature is above 5° C. When the ambient temperature is below 5° C., for example, a 4° C. phase change material PCM buffer can be used to passively raise the payload compartment temperature to the desired range of 2-8° C. until the PCM buffer is frozen. When the PCM buffer 150 is frozen, the thermal control unit 140 activates the heat pipe heater 160, thereby heating the payload compartment 210 through the heat pipe effect with the evaporator 120. The phase change material can be used to stay above freezing temperature in the compartment. In some embodiments, the heating and cooling modes can be reversed and/or repeated.

Figure 5:
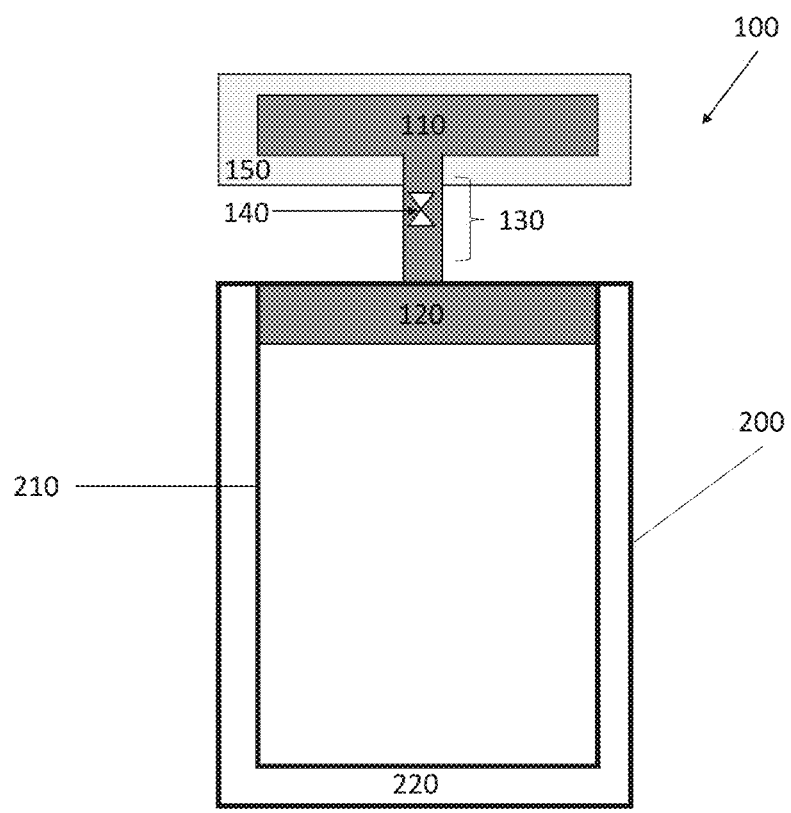
FIG. 5 is a schematic cross section drawing of a temperature-controlled container with a thermal regulation system in cooling configuration using an externally rechargeable sorption heat pump and a phase change material buffer in contact with the sorber.
Figure 6:
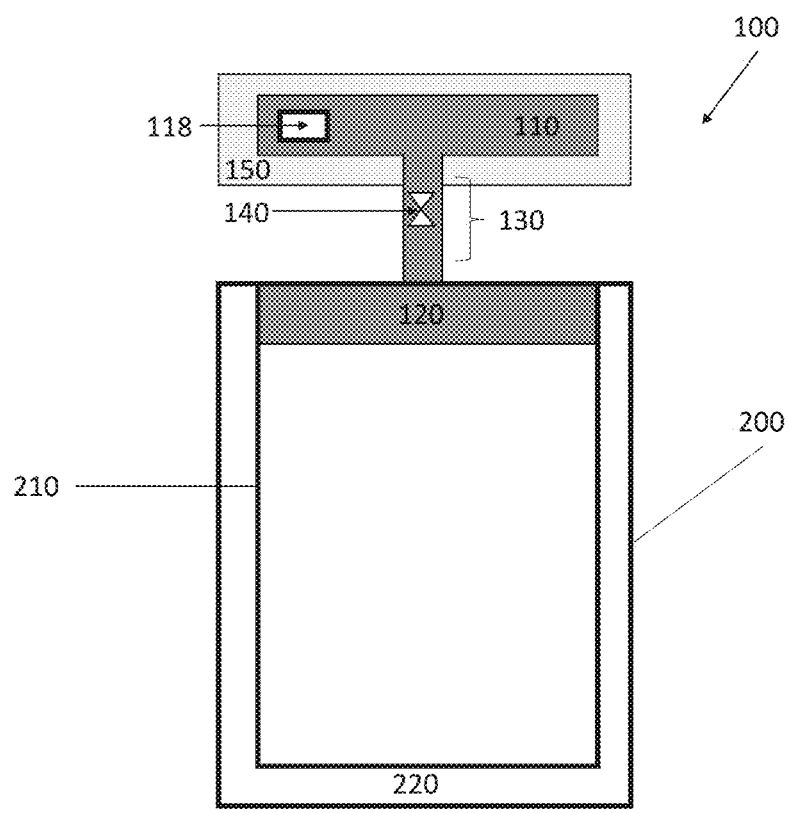
FIG. 6 is a schematic cross section drawing of a temperature-controlled container with a thermal regulation system in cooling configuration using an internally rechargeable sorption heat pump and a phase change material buffer in contact with the sorber.

FIGS. 5 and 6 show an additional embodiment of the invention in cross section. In these figures, the PCM buffer 150 is in thermal contact with the sorber 110. The PCM buffer 150 absorbs heat from the sorber 110 in order to regulate the temperature of the sorber 110 and protect the user from excess heat coming from the sorber 110. The evaporator 120 is situated inside the payload compartment 210 and cools the payload compartment 210. The vapor pathway 130 permits the flow of vapor from the evaporator 120 to the sorber 110. The thermal control unit 140 regulates the flow of vapor from the evaporator 120 to the sorber 110 in order to reach a temperature range inside the payload compartment 210. The payload compartment 210 and evaporator 120 are surrounded by a container 200, such as a vacuum insulated bottle. The amount and temperature range of the PCM buffer 150 is calculated according to the evaporator size, amount of material to be cooled, and the heat leak of the insulation layer 220. FIG. 6 includes an additional component, a sorber heating coil 118. The sorber heating coil 118 is used to heat the sorber 110 to recharge the sorption heat pump.

Some embodiments of the invention may be combined with a compressor system, or another variety of an existing system. The embodiment can be a battery free cooling and heating system for controlling temperature of a portable unit, but there may be instances when combining the invention with a compressor-based system (which does require batteries or electricity during use), could be desirable. For example, one may want the invention described as a backup system to a standard compressor-based cooling system or another variant or type of system.

As noted above, the sorption heat pump system 100 contains the thermal control unit 140, that allows for start stop (or on/off) system function. This results in the system being able to be stored ready to use at a variety of ambient temperatures and the temperature regulation function can be started or stopped as desired by the user, or as set by a control mechanism. For example, the on/off function may be triggered based on time or thermal thresholds (such as internal or external temperature and/or pressure or a combination thereof). As an additional example, the system could be started after a set amount of time, for instance as a backup system to provide cooling.

The temperature control system can be configured for use multiple times on a single "charge" where one could have temperature regulation activated for a period of time, then stop the temperature regulation for a period of time, then restart the temperature regulation again without needing any external inputs such as electricity, batteries, ice, or other new phase change materials. This can be repeated any number of times.

The temperature control system can also be a single-use or 'irreversible' control, such that once the unit is turned on, it must stay on for its full life and cannot be turned off (for example, through mechanical, electronic, or digital means, or a combination thereof). This could be valuable in tamper-evident systems where a user may want to be certain that the device has not been turned on previously.

The sorption heat pump system 100 can be non-separable from the walls of the temperature-controlled container 200.

The sorption heat pump system 100 can be separable from the walls of the temperature-controlled container 200. A fully used sorption heat pump system can be removed from the temperature-controlled container and replaced with a "charged" sorption heat pump system.

The phase change material PCM buffer 150 can be integrated into the evaporator 120 to enable a "heat pipe" effect within the evaporator. A heat pipe is a device, which moves heat via a continuous cycle of evaporation and condensation. Heat evaporates a liquid and the resulting vapor condenses in cooler areas and gives off the heat. This cycle continuously moves heat from warmer to cooler areas quite quickly. This heat pipe effect helps to maintain similar temperatures throughout the evaporator, and therefore throughout the payload compartment 210. The phase change material PCM buffer 150 can be integrated or adjacent to or otherwise thermally connected to the evaporator 120.

The sorption heat pump system 100 can use a specialized custom-designed desiccant as the sorption material that achieves an energy density, for example, of 150 Watthours per kilogram. However, the present invention can function with other varieties of desiccant including those not yet developed.

The evaporator 120 of the sorption heat pump system 100 can be made into a variety of geometric shapes. For example, the evaporator can be configured with any number of planar sides. The planar sides can be situated as to form an enclosed region. The evaporator can be connected thermally to other parts of the surface area of the payload compartment 210, for example, but not limited to, with copper, aluminum, heat pipes, and/or forced convection.

The sorber 110 of the sorption heat pump system 100 may be created using a special hot-fill process. First, the sorption material is heated and dried externally. The temperature range reached during heating needs to be optimized to achieve particular performance requirements without damaging the sorption material or the sorber vacuum barrier material 102 in FIG. 8. The sorber barrier material 102 used around the sorber 110 can be for example, from the list including, but not limited to, a multi-layer foil containing an aluminum or metallized barrier, or stainless steel, glass and/or plastics.

The sorber 110 of the heat pump 100 may be made into a variety of geometric shapes. For example, the sorber could be of a shape from the list including, but not limited to, cylindrical, spherical, and rectangular in a variety of dimensions. The sorber could be connected thermally to a variety of other materials, such as plastics, phase change material, metals, or gas.

Additional components of the system may be heated, degassed, and cleaned in special ways to achieve optimum performance.

The sorption heat pump 100 system can be rechargeable. The sorber 110 can be heated using, for example, but not limited to, heating plates, a water bath, an oil bath, hot air, and/or heating rods. The heating source can be integrated inside the sorber or outside the sorber. The evaporator side can be cooled during recharging using any cooling method, for example, but not limited to, natural convection, forced convection, a liquid bath, an air flow, cold plates, cold fingers, and/or cold sprays.

The thermal control unit 140 may be one or more of several types. For example, the thermal control unit 140 could be composed of a bistable valve that restricts the flow of the working material. The thermal control unit could be composed of an on/off valve. The thermal control unit could include a check valve, or other varieties of valve, or even valves yet to be developed.

In some embodiments, the thermal control unit could also be sensitive to temperature, in this case described as a thermostat. Such a thermostat could be one of several types, such as, but not limited to, a bimetal or capillary component or a pressure regulator thermostat.

The payload compartment 210 may be insulated using any insulative material, such as, but not limited to, vacuum insulation panels (VIPs), cardboard, foam, plastic, fiberglass insulation, and/or vacuum insulation.

The sorption heat pump system 100 could also be used outside of an insulation in order to maintain a standard temperature (e.g., a cooling unit add-on that is placed in front of a fan for rapid temperature-controlled air access at a set temperature).

The sorption heat pump system 100 could be under a vacuum. If under a vacuum, that vacuum could be kept in a variety of ways, either through an active pump or through evacuation and hermetic sealing to maintain the vacuum over time.

The PCM buffer 150 can be physically incorporated into the sorption heat pump system 100 or the PCM buffer could be thermally connected to the sorption heat pump system or the PCM buffer could be separate from the sorption heat pump system and simply part of the same system in effect.

The sorption heat pump system 100 can be used to COOL or HEAT or maintain at a given temperature range.

The evaporative material can be water, which is non-toxic, but is not limited to water. The evaporative working material could also be, but not limited to, ammonia and/or a refrigerant, and/or other materials with an appropriate vapor pressure.

The desiccant can be zeolite, including a binder-free zeolite, but is not limed to zeolites; the desiccant could also be, but not limited to, calcium chloride or silica or other materials that sorb the evaporative working material(s).

The PCM buffer 150 can be liquid or solid or gel, or other states of matter (such as, but not limited to, liquid crystal) or a combination thereof. The PCM buffer can be molded around the evaporator 120, the sorber 110, and/or be placed around the edges of the payload compartment 210.

The sorption heat pump system 100 may be configured for single-use or reusable. The PCM buffer 150 may be configured for single-use or reusable. The temperature-controlled container 200 may be configured for single-use or reusable.

Figure 7:
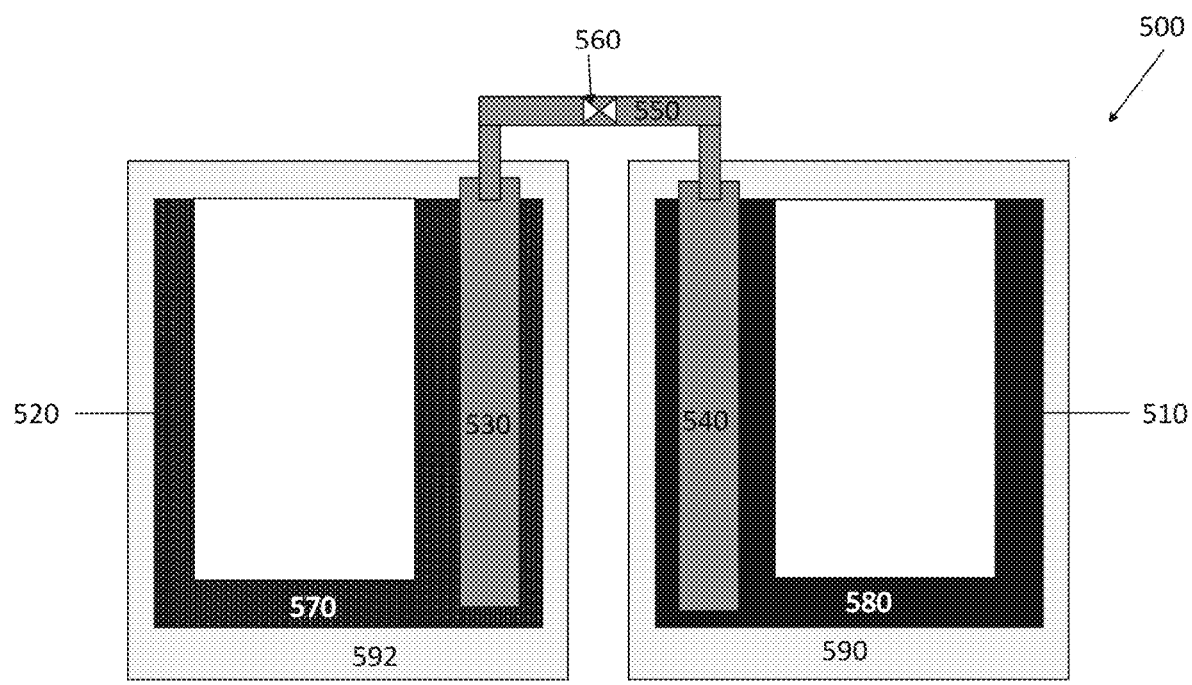
FIG. 7 is a schematic cross section drawing of a two-chamber temperature-controlled container, where each chamber is a different temperature, using a sorption heat pump system and multiple phase change material buffers.

FIG. 7 shows a schematic cross section of an embodiment of a two-chamber temperature controlled container 500 with a sorption heat pump system configured to include two payload compartments 510 and 520 at different temperatures. In this embodiment, the payload compartment 510 is warmed by a sorber 540 and the payload compartment 520 is cooled by an evaporator 530. A warm PCM buffer 580 helps regulate the temperature of the payload compartment 510 and a cool PCM buffer 570 helps regulate the temperature of the payload compartment 520. The payload compartment 510 is heated while the payload compartment 520 is cooled at the same time. A vapor pathway 550 permits the flow of vapor from the evaporator 530 to the sorber 540 as controlled by a thermal control unit 560. The payload compartment 510, the warm PCM buffer 580 and the sorber 540 are surrounded by a warm insulation layer 590. The payload compartment 520, the cool PCM buffer 570 and the evaporator 530 are surrounded by a cool insulation layer 570. Depending on the temperature ranges desired in payload compartments 520 and 510, the PCM buffers 570 and

580 may be individually or both removed. The sorption heat pump system comprising the evaporator 530, sorber 540, vapor pathway 550 and thermal control unit 560 could be swapped in and out for recharging outside of the two-chamber temperature controlled container 500 or it may be charged in place.

Figure 18:
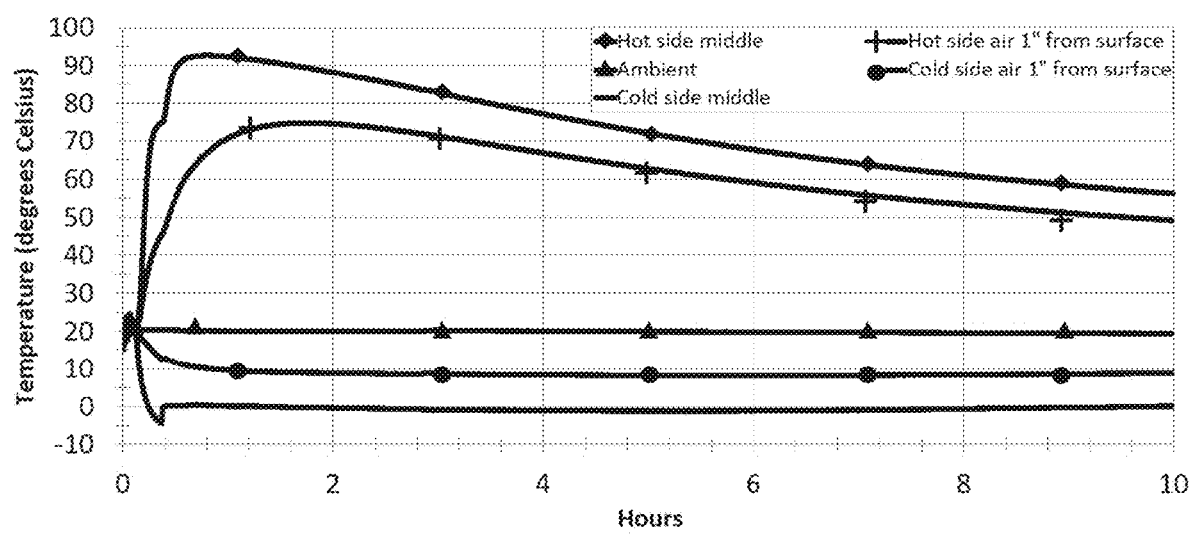
FIG. 18 is a graph of thermal performance of a prototype of the two chamber temperature-controlled container of FIG. 7, where one chamber is heated and one chamber is cooled by the sorption heat pump.

FIG. 18 shows example thermal performance data from a prototype of the two-chamber temperature controlled container 500 of FIG. 7 with a sorption heat pump system. In FIG. 18, "hot side" refers to the sorber 540 and "cold side" refers to the evaporator 530. FIG. 18 shows a payload compartment 510 warmed to temperatures greater than 50° C. and payload compartment 520 cooled to temperatures lower than 10° C. at an ambient external temperature of 20° C.

A benefit of certain embodiments of the temperature-controlled container 200 is the ability to have a device ready to use immediately for regulating temperature without the need for any refrigeration or heating of a phase change material prior to use.

Another benefit of certain embodiments of this system is that it can be lower weight than systems that only use phase change material, given the greater energy density possible in the evaporative phase change process within the sorption heat pump system.

An additional benefit of certain embodiments of this system is being able to not require an active heating or cooling system during use because the combination provides adequate thermal protection. This is particularly true for cold weather protection (versus an active heating system or simply good insulation).

Yet another benefit of certain embodiments of the temperature-controlled container 200 is that the phase change material PCM buffer 150 does not need to be frozen or refrigerated separately from the system, which leads to easier logistics when in use. The entire system can sit at a variety of room temperatures, and once the sorption heat pump valve is opened, the desired system temperature will be reached. This is a significant improvement from existing systems, many of which require either built-in heating or cooling powered by electric input from a battery or other means. In addition, many other systems require external heating or cooling immediately prior to use, which adds significant logistic constraints. Certain embodiments of this system remove both of the aforementioned logistics constraints, which are common in current usage: (1) No external energy input is required during use to maintain the desired temperature, and (2) No active heating or cooling systems are required immediately prior to system use.

A further benefit of certain embodiments of the sorption heat pump system 100 is the use of the thermal control unit 140 to control when the system is in operation. When the thermal control unit opens the valve, the system is in active temperature regulation operation. However, the valve can be closed partway through operation and maintain the remaining thermal power of the system. Then, when needed again, the valve can be reopened, all without the need of any external energy input. The switchable nature of the system is valuable in giving additional flexibility for use.

A benefit of certain embodiments of the sorption heat pump system 100 is that they can maintain a set temperature range when the ambient temperature is both either hotter than desired or colder than desired.

Figure 8:
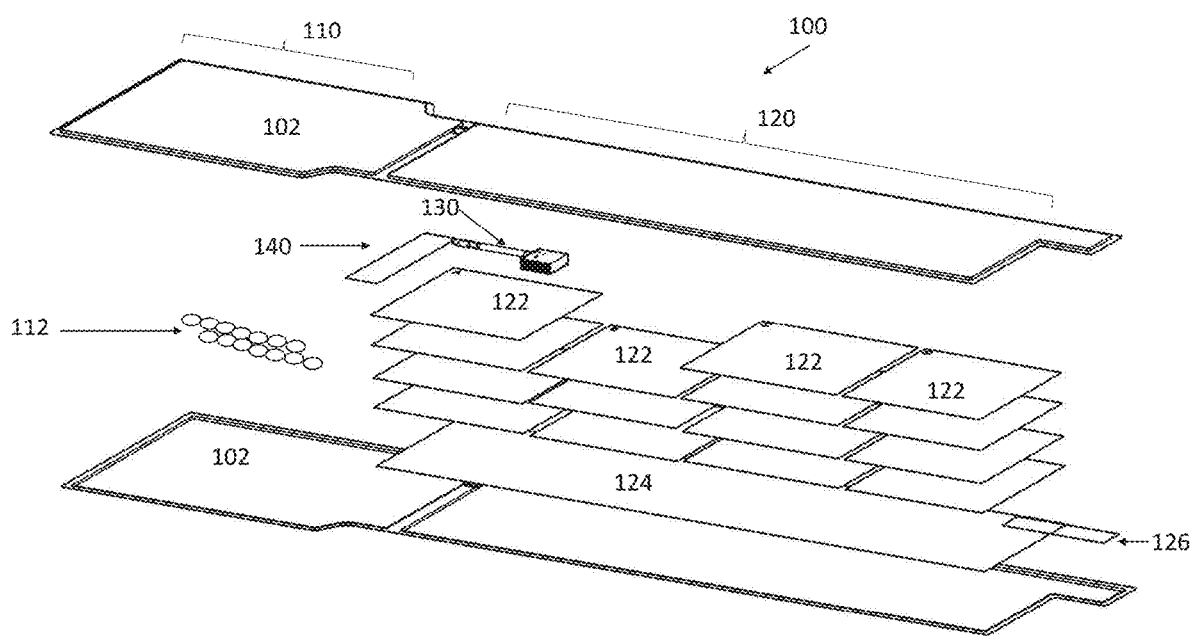
FIG. 8 is an exploded view of the components of the sorption heat pump.

The design of the sorption heat pump system 100 may be in a substantially linear fashion, such as shown in FIG. 8. For the purposes of this embodiment, the sorber 110 section is on the left and the evaporator 120 section on the right, but they may be in different configurations. The thermal control unit 140 is in the middle, though it may be located elsewhere in other embodiments. The width of the sorber 110 and the evaporator 120 may be equal to each other, or they may be unequal. The design may be encased in an external barrier material 102 layer comprised of one or more materials which, depending on the materials, may have different thermodynamic properties; in the case of a barrier of multiple materials they may differ, allowing the system to focus heat pumping into certain areas while limiting the thermodynamic interaction of others.

The thermal control unit 140 may be composed of tubes, pipes, or other material, which allows a flow of vapor while supporting a vacuum area through which the vapor flows. This material may be a uniaxially rigid grid material. The material may also be a biaxial or triaxial grid material.

The thermal control unit 140 may be closed externally by pinching a tube. The tube may be pinched closed by sliding a second component between the tube and a third component. The tube of the thermal control unit may be opened by pulling a tab. In some embodiments, the tube may be closed by using a valve and/or plug. The tab may be a substantially rectangular component; however, the tab may take other shapes and configurations for other embodiments. In some embodiments, the tube may be flexible while in others it may be inflexible, and utilize alternative methods of closing.

Figure 12A:
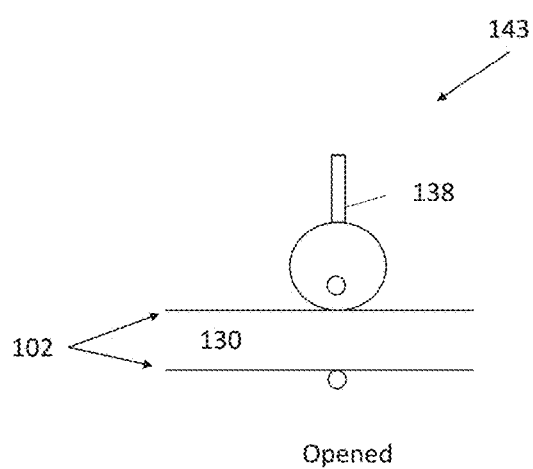
FIG. 12A is a cross section view of an example thermal control unit valve mechanism shown with the vapor pathway opened.
Figure 12B:
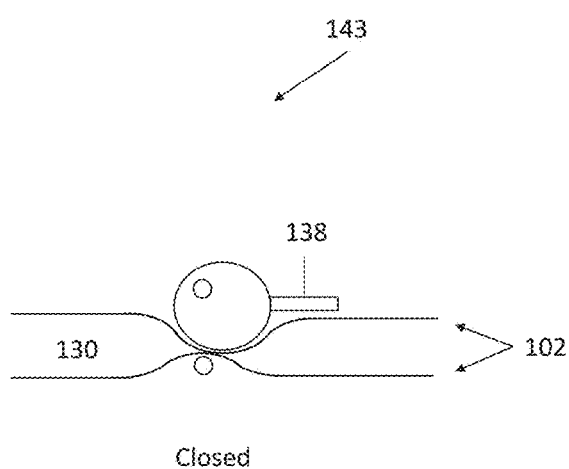
FIG. 12B is a cross section view of the example thermal control unit valve mechanism of FIG. 12A shown with the vapor pathway closed.
Figure 12C:
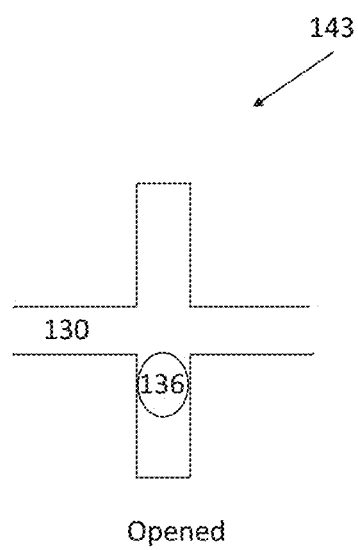
FIG. 12C is a cross section view of a second example thermal control unit valve mechanism using an internal stopper forming a barrier within the vapor pathway, shown with the vapor pathway opened.
Figure 12D:
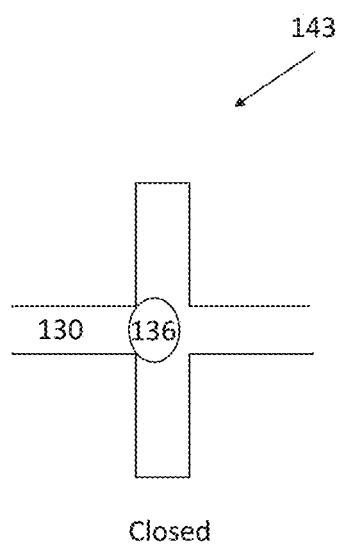
FIG. 12D is a cross section view of the second example thermal control unit valve mechanism of FIG. 12C using an internal stopper forming a barrier within the vapor pathway, shown with the vapor pathway closed.

The valve 143 of the thermal control unit 140 may be designed as shown schematically in FIGS. 12A and 12B, or alternatively, as shown schematically in FIGS. 12C and 12D. In FIGS. 12A and 12B, an external actuator 138 is positioned adjacent to the vapor pathway 130. FIG. 12A shows the external actuator 138 in the opened position, which allows vapor to flow through the vapor pathway 130. The actuator 138 is rotated to close the vapor pathway 130 to vapor flow. FIG. 12B shows the valve 143 in the closed position. The actuator 138 is designed to be opened and closed repeatedly, either by a user or by a controller. The external actuator 138 is positioned outward of the vacuum barrier material 102. Other embodiments may involve a switch, button, or pulling mechanism to actuate the valve.

FIGS. 12C and 12D show a vapor pathway 130 composed of a flexible tube wherein lies an internal stopper 136 that is positionable to form a barrier within the vapor pathway 130. The internal stopper 136 is positioned inward of the vacuum barrier material 102. The internal stopper 136 may be placed in the open or closed position via squeezing the tube of the vapor pathway 130 in the appropriate place from the outside. In FIG. 12C, the vapor pathway is shown opened, and in FIG. 12D, the vapor pathway is shown closed. In other embodiments, the tube may instead be rigid or only partially flexible and operated by a valve or other securing means.

In the evaporator section of the sorption heat pump system 100 shown in FIG. 8 by way of example, the location and amount of a sorbing or wicking material 122 should be optimized for optimal performance based on the needs of the user and environment. The amount of this material may be more or less on the bottom of the evaporator 120 once placed interior of the insulation layer 220. The amount of this material may be more or less on the sides, or the top, of the evaporator 120 once placed in the insulation layer 220. In some embodiments, the material may only partially contact the sides of the temperature-controlled container 200 (not shown in FIG. 8), while in others it will be flush or fully contact.

Figure 11:
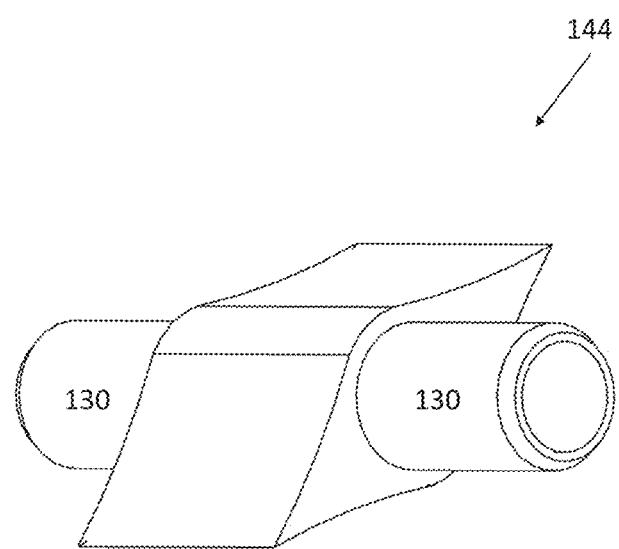
FIG. 11 is an example of a vapor pathway coupler.

The sorber 110 and evaporator 120 of the sorption heat pump system 100 may be connected by one or more coupler (s) 144 (see FIG. 9) which may be attached, welded, glued, or otherwise hermetically sealed to the external barrier material 102. This spout or coupler may then allow vapor flow through only a controlled cross section between the evaporator 120 and the sorber 110. An example of this coupler part is shown in FIG. 11.

The temperature-controlled container 200 may be an insulated box having any number of sides cooled, including 2 sides and the top and bottom. The insulated box may include having the 4 sides cooled but not the top or bottom. In some embodiments all sides of the container may be cooled based on the arrangement of the device; the device may function inside containers with a variety of shapes including a variety of cuboids, cylinders, prisms, or containers taking other shapes.

The sorption heat pump system 100 may be evacuated through one or more evacuation ports 126, as shown in FIG. 8. The evacuation port 126 may be composed of a grid material, which allows gas, and vapor flow through it. The evacuation port 126 may be sealed by means of heat and/or pressure and/or adhesives and/or other sealing means.

Figure 13A:
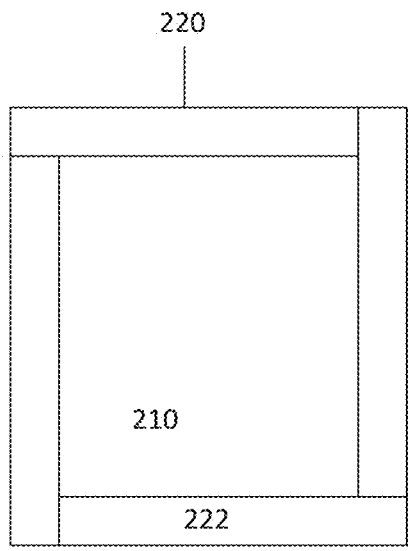
FIG. 13A is a cross section view of an example insulated container made of vacuum insulation panels.
Figure 13B:
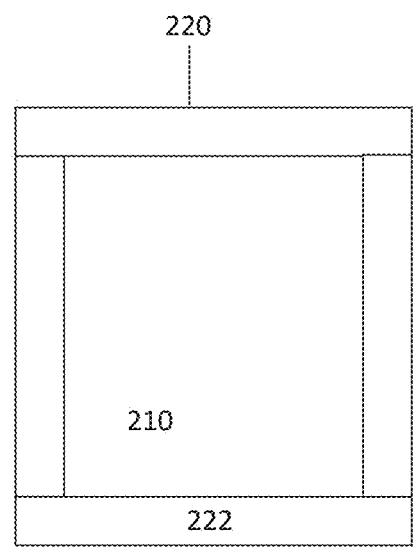
FIG. 13B is a cross section view of another example insulated container made of vacuum insulation panels.

The insulated layer 220, which substantially encloses the payload compartment 210, may be insulated with vacuum insulation panels (VIPs) 222. Two examples of the arrangement of the VIPs 222 are shown in FIGS. 13A and 13B. The VIPs 222 may be arranged such that interior access to the payload compartment 210 is gained through a lid on top, or through a door on a side. Some examples of the invention may incorporate openings or doors that are incorporated into one of the sides or the lid/top; such variants may further incorporate seals to prevent insulation inefficiency.

The shape of the sorber 110 may be formed by a bag. The bag may be a simple 2-sided bag, or the bag may have more than 2 sides. The bag may be shaped similar to a retort bag, or a gusseted bag. Some examples of the sorber 110 section may have a more rigid structure such as a bag that is shaped such that it takes on a rounded-edge cubic shape, or it may be of a rigid enough structure to hold an edged three-dimensional shape.

The vacuum barrier material 102 and the design of the sorption heat pump system 100 should be selected to allow the required functions while minimizing the amount of heat transferred across the insulation layer 220. This can be done by selecting thin materials with low thermal conductivity and by mechanical design which keeps the range of material crossing the insulation layer 220 to a minimum. If desired for a specific outcome, alternative variants may vary the thickness of the insulation layer 220 on some or all of the sides to achieve results such as fitting in a particular container more securely, or to direct the heat transfer. One such vacuum barrier material 102 is a multilayer laminate material made from layers of differing materials where at least one layer has low gas transfer rates, such as aluminum, and additional material layers, which add strength to the overall laminate and allow for sealing the material together with low gas leak rates. One preferred embodiment of the vacuum barrier material 102 is a multilayer laminate with an aluminum layer of at least seven micrometers thickness and a sealing layer of polypropylene or polyamide with a melting temperature greater than 150 degrees Celsius. While metal or glass traditionally have the lowest gas transfer rates, any material that achieves a helium leak rate of less than 10-4 millibar liters per second is suitable, even if it does not contain metal or glass.

One embodiment of the invention is a shelf-stable temperature-controlled container 200 that can provide a temperature-controlled space independently on-demand without any external inputs (no pre-frozen ice, pre-conditioned PCM, or non-battery electricity must be used). This is accomplished using an inventive thermal regulation system that maintains the temperature of the container within a set range for a period of time. For example, the temperature-controlled container 200 maintains a 12 liter internal volume of space at a temperature between 2-8° C. for at least 96 hours at an external ambient temperature of 30° C. The thermal regulation system is a system that contains the sorption heat pump system 100, and in some embodiments, a phase change material PCM buffer 150. The thermal regulation system also includes the thermal control unit 140 to control the amount of cooling and/or heating supplied by the thermal regulation system, depending on the desired internal temperature and the heat load of the temperature-controlled container 200. The thermal control unit 140 includes a valve to control the vapor flow inside the sorption heat pump.

Temperature-Controlled Container 200:

The standard methods for cooling a portable container include using compressors, thermoelectric devices, or a phase change material such as ice. These all have certain drawbacks: compressors and thermoelectric devices require a near-constant supply of electricity, either via plug or relatively large batteries; compressors are relatively noisy; thermoelectric devices are effective only in limited temperatures ranges and are extremely inefficient; phase change materials require a pre-conditioning process (i.e. freezing) before use and must be kept constantly frozen to avoid melting.

One preferred embodiment of the present invention of the temperature-controlled container 200 is a portable container that avoids all of these drawbacks. The container is "pre-charged" and can then be stored at room temperature before use. When cooling is desired, the thermal control unit 140 is activated and cooling starts immediately, with no need for any external inputs, such as electricity or phase change materials. The preferred embodiment is near-silent, does not require any electrical input or large batteries, is effective across a very wide range of temperatures, is relatively efficient, and does not require any pre-conditioning process immediately prior to use.

The temperature-controlled container 200 consists of several integrated systems. First, the insulated space payload compartment 210 is cooled and/or heated to a set temperature range such as 2-8° C. The purpose of the insulation layer 220 is to limit the amount of heat moving in or out of the payload compartment 210. In this case, the vacuum insulated panels (VIPs) 222 are used as the insulation layer 220; however, the insulation could be vacuum insulation (like vacuum bottles), expanded polystyrene, expanded polypropylene, or other insulating foams or materials. Second, the insulation layer 220 formed by the VIP panels is contained within an outer carton, which may be made of cardboard or plastic. Third, a thermal control unit 140 is used to move, generate, or absorb heat depending on the relative difference between the outside temperature and the desired temperature of the payload compartment 210.

Thermal Regulation System:

The thermal control system is comprised of several integrated systems. First, the sorption heat pump system 100 is used to provide active cooling when the outside temperature is warmer than the desired internal temperature. Second, when the outside temperature is slightly below the desired internal temperature, or below for a relatively shorter period of time, the phase change material PCM buffer 150 containing the phase change material (PCM) is used in concert with the sorption heat pump system 100 to passively maintain the temperature of the payload compartment 210 within a desired specified range. Third, if the outside temperature is significantly lower than the desired internal temperature, or lower for a longer period of time, then the phase change material capacity may be exhausted, in which case a heat pipe heater 160 is used in concert with the sorption heat pump system 100 to maintain the payload compartment 210 at a desired specific temperature. Fourth, the thermal control unit 140 senses the temperature of the payload compartment and regulates the amount of heating and cooling to maintain the payload compartment at the desired specified temperature.

The sorption heat pump system 100 is a system composed of the evaporator 120 and the sorber 110. The sorber 110 is placed outside of the payload compartment 210 and the evaporator 120 is placed inside the payload compartment 210. The sorber and evaporator are joined by the vapor pathway 130 through which heat is transferred by a vapor. The vapor pathway cross section is controlled by the thermal control unit 140, which can variably open and close a valve to allow the vapor to flow through or to slow or halt the flow of vapor. When the valve is open, the vapor evaporates in the evaporator 120 and is adsorbed or absorbed in the sorber 110, thereby transferring heat from the evaporator to the sorber.

Construction of the Sorption Heat Pump System 100:

FIG. 8 shows the internal components of one embodiment of the sorption heat pump 100. The sorption heat pump system 100 uses zeolite 112 as the sorption material in the sorber 110 and water as the working material. In the preferred embodiment, the sorption material is simply placed inward of the barrier material 102 in the sorber. In an additional embodiment, the sorption material is contained inside a removable cartridge and the sorber has a cartridge receiver within which the cartridge is removably positionable. The sorption heat pump system 100 is entirely enclosed in a multilayer foil barrier 102 made of an envelope of barrier material with high gas barrier properties so that a vacuum level of 1-10 millibar may be created and maintained inside the foil barrier 102 envelope made of the barrier material. The zeolite 112 is enclosed in the sorber 110. A conduit comprises the vapor pathway 130 extending between the sorber 110 and the evaporator 120 to allow the flow of water vapor from the evaporator 120 to the sorber 110. Inside the evaporator are several layers of different materials. The wicking material 122 is used to hold and distribute the liquid water around the entire evaporator. A semi-rigid channel material 124 is used to create channels between the wicking material 122 and the foil barrier 102 through which the water vapor can flow freely. When heat is applied to the surface of the evaporator, the liquid water evaporates. The resultant water vapor flows towards the sorber 110 through the channel material 124, eventually flowing through the water vapor pathway 130 into the sorber 110 where the water binds with the zeolite 112. The water vapor moves heat from the evaporator 120 to the sorber 110. The zeolite 112 effectively removes the water vapor from the enclosed environment, which allows more liquid water to evaporate in the evaporator and continue the cooling process. In FIG. 8, the sorber 110, the evaporator 120, the vapor channel 130 and the thermal control unit 140 are all inward of the vacuum barrier material 102. The evaporator 120, the sorber 110, the vapor channel 130 and the thermal control unit 140 may be substantially enclosed in separate vacuum barrier materials. The thermal control unit 140 may be partially inward and partially outward of the vacuum barrier material 102. The thermal control unit 140 may in some embodiments be fully outward of the vacuum barrier material 102.

The cross-sectional size of the vapor pathway 130 depends on the desired amount of heat transferred by the heat pump. A cross-sectional vapor pathway 130 size between 0.01 and 10 square centimeters will achieve heat transfer rates between 0.1 watts and 200 watts. A preferred embodiment has a cross-sectional vapor pathway size between 0.1 and 5 square centimeters. The shape of the cross section of the vapor pathway 130 may also minimize excess heat transfer. A preferred embodiment has a vapor pathway 130 maximum size in one dimension between 0.01 and 2 centimeters.

In the embodiment wherein the sorption material is zeolite and the working fluid is water, the ratio of zeolite to water impacts the correct functioning of the sorption heat pump 100. A ratio between 100 and 500 grams of water per kilogram of desorbed zeolite is desirable, and a ratio of 150-350 grams of water per kilogram of desorbed zeolite is preferred for improved heat transfer and overall system mass. The size and shape of the zeolite 112 also impact improved vapor flow within the sorber 110. A zeolite granule diameter between 0.5 and 12 millimeters is desirable, while a diameter between 2.5 and 5.0 millimeters is preferred.

Phase Change Material PCM Buffer 150:

In some embodiments, the properties of the sorption heat pump 100 and the PCM buffer 150 are combined to create an integrated system that can both cool and heat the payload compartment 210. The cooling is provided by the sorption heat pump system 100 as described above. The heating is provided by the PCM buffer 150. This is accomplished by placing a layer of the PCM buffer 150 in thermal contact with the evaporator 120 of the sorption heat pump system between the insulation layer 220 and the evaporator 120. The layer of the PCM buffer 150 is enclosed in an evacuated foil barrier material 102 envelope with high gas barrier properties.

When the outside temperature is lower than the desired inside temperature, heat flows out of the payload compartment 210. Normally the payload compartment temperature would then decrease. The layer of the PCM buffer 150 acting in concert with the heat pump evaporator 120 arrests and slows this temperature decrease. The heat outflow causes the temperature of the PCM buffer 150 to decrease until the phase change temperature is reached. The PCM then releases latent heat as it changes phase (freezes), thereby arresting and slowing the temperature decrease in the payload compartment 210 for a period of time. The thermal control unit 140 stops the flow of vapor from the evaporator 120 to the sorber 110 when cooling is not desired. The heat pump evaporator 120 then acts in concert with the layer of the PCM buffer 150 as a heat pipe to distribute the PCM latent heat around the payload compartment 210. Otherwise, areas of the payload compartment away from the PCM buffer layer would still continue to fall in temperature. Once the PCM has changed phase completely, the temperature of the payload compartment continues to fall.

In FIG. 2, the sorption heat pump system 100 and the phase change material PCM buffer 150 components are combined with the phase change material acting as a thermal buffer. FIG. 2 shows a system in which the internal payload compartment 210 is maintained at a temperature cooler than the ambient temperature surrounding the compartment. The evaporator 120 and the phase change material PCM buffer 150 are both situated inside the payload compartment 210 in thermal contact with each other. The sorber 110 is situated outside the payload compartment 210. The phase change material has a high specific energy density (for example, it can be a material with a phase transition at 5 degrees Celsius with a thermal storage capacity of 200-250 J/g).

Active Heating Unit:

For most use scenarios, where the outside temperatures stay between −10° C. and 35° C., the sorption heat pump system 100 using the PCM buffer 150 is sufficient. For example, the industry standard ISTA 7D winter test profile can be achieved. In some scenarios, the outside temperature may get colder than −10° C. or stay colder longer than the ISTA 7D winter temperature profile. In that case, an additional heat source is needed. FIG. 4 shows the addition of the heat source in the form of a heat pipe heater 160 in thermal contact with the heat pump evaporator 120. The heat pipe heater 160 heat source may be an electrical resistive heat source, or a chemical heat source, or a thermoelectric heat source. When the layer of the PCM buffer 150 is completely frozen, the thermal control unit 140 turns on the pipe heater to provide additional heat. This additional heat is transported around the payload compartment 210 by the heat pump evaporator 120 acting as a heat pipe.

Figure 9:
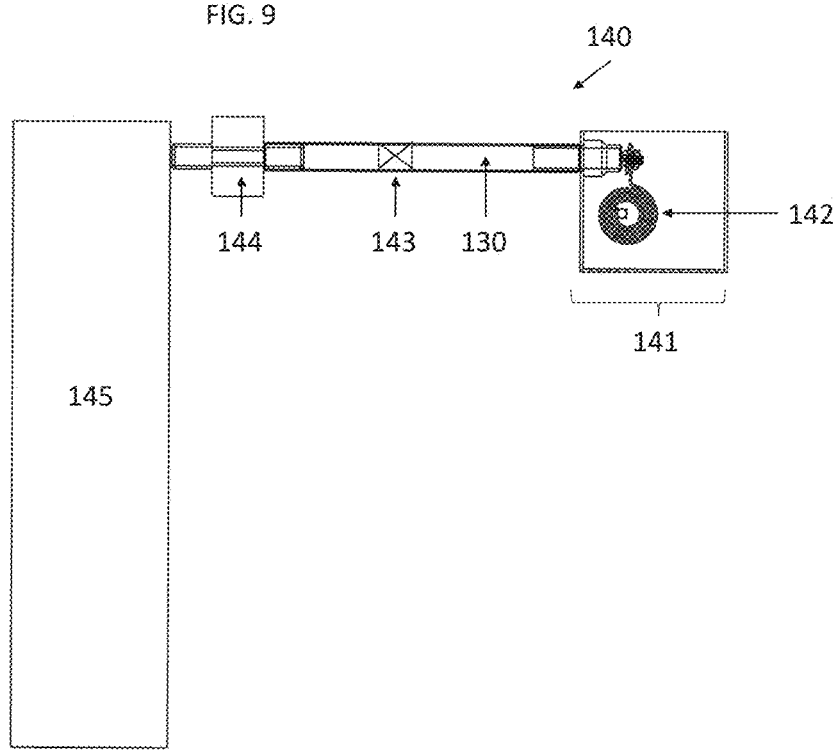
FIG. 9 is a view of an example thermal control unit.
Figure 10:
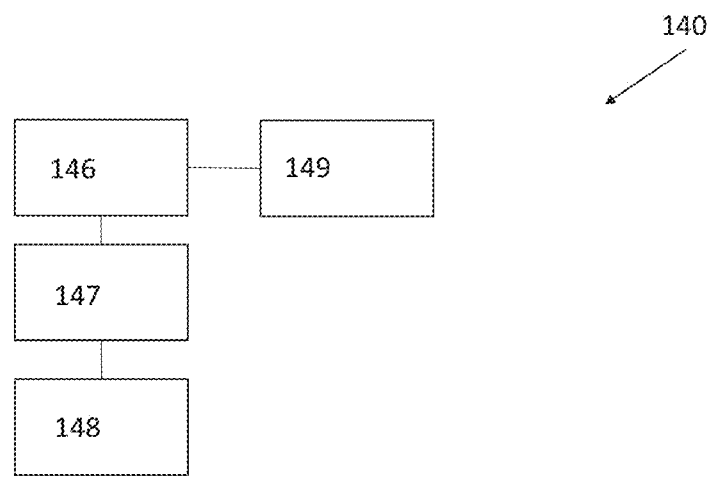
FIG. 10 is a schematic diagram of an example thermal control unit.

Thermal Control Unit 140:

The thermal control unit 140 monitors the temperature of the payload compartment 210, compares it to a desired temperature, and adjusts the cooling and heating rates to reach and maintain the desired temperature. The thermal control unit 140 includes a device to control the rate of flow of water vapor from the evaporator 120 to the sorber 110 in the sorption heat pump system 100. Two examples of this vapor flow rate control are shown in FIGS. 9 and 10. In FIG. 9, a valve 143 is opened and closed by the user or a controller to start and stop the movement of vapor through the vapor pathway 130. The valve 143 may be inward or outward of the vacuum barrier material 102 shown in FIG. 8. The rate of movement of the vapor, and therefore the temperature, is controlled by a mechanical thermostat 141 attached to the vapor pathway 130. Inside the mechanical thermostat 141 is a coil of bimetal 142, which changes shape in response to temperature changes and opens or closes an orifice in the vapor pathway 130. The mechanical thermostat 141 is in thermal contact with the evaporator 120. The bimetal 142 is situated such that it closes the vapor pathway 130 when the payload compartment 210 temperature is below the desired setpoint, and opens the vapor pathway 130 when the temperature of the payload compartment 210 is above the desired setpoint. The vapor pathway 130 is sealed to the material of the barrier 102 by the coupler 144. At the end of the vapor pathway 130 opposite to the mechanical thermostat 141 is a sorber channel 145. The sorber channel 145 distributes the vapor to the zeolite 112 inside the sorber 110.

FIG. 10 shows a schematic diagram for a second example of the thermal control unit 140. A controller 146 measures the temperature inside the payload compartment 210 via a temperature sensor 149. The controller 146 signals a gearmotor 147 to open or close a valve 148 in response to the temperature sensor 149. The valve 148 is situated to open or close (partially or fully) the vapor pathway 130.

Figure 19A:
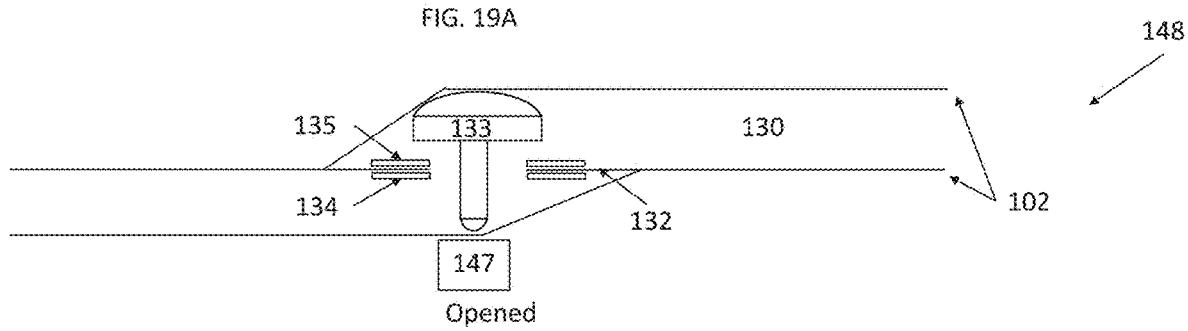
FIG. 19A is a cross section view of a third example thermal control unit valve mechanism shown with a valve operated to open the vapor pathway.
Figure 19B:
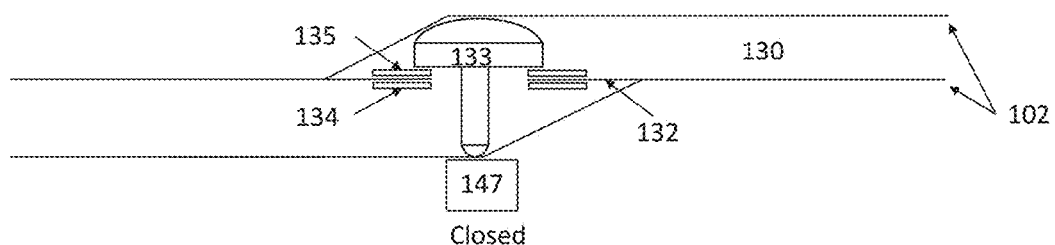
FIG. 19B is a cross section view of a third example thermal control unit valve mechanism shown with the valve operated to close the vapor pathway.

FIGS. 19A and 19B show cross sections of an example valve 148. FIG. 19A shows the valve 148 in the opened position and FIG. 19B shows the valve 148 in the closed position. The vapor pathway 130 is enclosed by barrier material 102. A seal barrier material 132 is sealed at each end to opposite inward sides of the barrier material 102, which completes the internal seal across the vapor pathway 130 when the valve 148 is closed. On one side of the seal barrier 132 is a stabilization plate 134 and on the other side is a seal gasket 135. In the preferred embodiment, a seal pin 133 is normally sealed closed against the seal gasket 135 by atmospheric pressure. In an additional embodiment, the seal pin is in the normally open position and movable to the closed position. The seal pin 133 is movable by a user or by an actuator, such as the gearmotor 147. When the seal pin 133 is in the open position, vapor flows through the vapor pathway 130. The seal pin 133 is opened and closed partially or fully to allow a specific vapor flow rate through the vapor pathway 130 to maintain the temperature in the payload compartment 210 within a specified range.

The thermal control unit 140 does not interact with the layer of the PCM buffer 150, which passively impacts the temperature as described above. The thermal control unit 140 turns the heat pipe heater 160, on and off as needed to reach the desired temperature of the payload compartment 210.

Method of Reuse of Thermal Regulation System:

Some sorption heat pumps are reversible, reconditionable, or "chargeable." This means that the working material can be desorbed from the sorption material, typically by means of pressure and temperature. In some embodiments of the invention, the means of reversing the sorption heat pump system 100 are not built into the sorption heat pump system itself, because this would add additional expense, weight, and space to the product. Instead, a method of reversing, reconditioning, or recharging, the sorption heat pump system in a controlled "recharging" facility, is provided.

After use, the thermal regulation system or sorption heat pump system is returned to a charging facility. The sorption material in the sorber 110 and the working material in the evaporator 120 are removed from the barrier material 102. The sorption material is processed, or reconditioned, or desorbed to prepare the material for another use. The desorbed sorption material and the working material are then replaced into a new barrier material envelope. The sorption heat pump system 100 is then ready for another use.

Embodiments of the present disclosure can be described in view of the following clauses:

1. A sorption heat pump, comprising:
   an evaporator structured to contain a working fluid, and operable to evaporate the working fluid to produce a working fluid gas in the evaporator;
   a sorber structured to contain a sorption material to sorb the working fluid gas during a sorption phase;
   a vapor pathway connecting the evaporator and the sorber; and
   a thermal control unit positioned to control the rate of vapor flow between the evaporator and the sorber through the vapor pathway, and being selectively operable to permit the flow of working fluid gas through the vapor pathway, to next stop the flow of working fluid gas through the vapor pathway, and after stopping the flow to then permit resumption of the flow of working fluid gas through the vapor pathway.

2. The sorption heat pump of clause 1, further including a vacuum barrier material positioned about the sorber and the evaporator to provide a reduced pressure therewithin to promote evaporation of the working fluid at a reduced temperature compared to the temperature required at ambient pressure.

3. The sorption heat pump of clause 2, wherein the vacuum barrier material is a multilayer laminate material.

4. The sorption heat pump of clause 2 or 3, wherein the vacuum barrier material is also positioned about the vapor pathway.

5. The sorption heat pump of clause 4, wherein the vacuum barrier material is a multilayer laminate material.

6. The sorption heat pump of any of clauses 2-5, wherein the thermal control unit is positioned inward of the vacuum barrier material.

7. The sorption heat pump of any of clauses 2-6, wherein the thermal control unit is positioned outward of the vacuum barrier material.

8. The sorption heat pump of any of clauses 2-7, wherein the thermal control unit is positioned partially inward of vacuum barrier material and partially outward of the vacuum barrier material.

9. The sorption heat pump of any of clauses 2-8, wherein the sorption material is zeolite, the working fluid is water, and the reduced pressure is equal to or less than 10 mbar absolute pressure.

10. The sorption heat pump of any of clauses 2-9, wherein the vacuum barrier material is a multilayer laminate material with an aluminum layer of at least seven micrometers thickness and a sealing layer of polypropylene or polyamide with a melting temperature greater than 150 degrees Celsius.

11. The sorption heat pump of any of clauses 1-10, further including a vacuum barrier material positioned about the sorber, evaporator, and vapor pathway to provide a reduced pressure therewithin to promote evaporation of the working fluid at a reduced temperature compared to the temperature required at ambient pressure, the vacuum barrier material being a multilayer laminate material and including first, second, and third multilayer laminate material portions, and the thermal control unit includes a vapor control valve made from the first, second, and third multilayer laminate material portions, a seal gasket, and a seal pin operable to control the rate of vapor flow between the evaporator and the sorber through the vapor pathway, the third multilayer laminate material portion having a first end portion and a second end portion, the first end portion being in sealed engagement with the first multilayer laminate material portion and the second end portion being in sealed engagement with the second multilayer laminate material portion to define an internal barrier, the third multilayer laminate material portion being positioned with the seal gasket to create a stable sealing surface, the seal pin protruding through the third multilayer laminate material portion, but not through the first multilayer laminate material portion or through the second multilayer laminate material portion, the seal pin being located proximal to the seal gasket, and the seal pin being movable toward the sealing surface by atmospheric pressure.

12. The sorption heat pump of clause 11, wherein the thermal control unit further includes a gearmotor positioned outward of the first and second multilayer laminate material portions and proximal to the seal pin, the gearmotor being operable to move the seal pin to at least one of at least partially opening the vapor control valve and at least partially closing the vapor control valve.

13. The sorption heat pump of clause 12, wherein the gearmotor is operable to move the seal pin by pushing on the seal pin and deforming the vacuum barrier material, and closing the vapor control valve by not pushing on the seal pin.

14. The sorption heat pump of clause 12 or 13, wherein the gearmotor is controlled by a controller.

15. The sorption heat pump of any of clauses 1-14, further including a first vacuum barrier positioned about the sorber, a second vacuum barrier positioned about the evaporator, and a third vacuum barrier positioned about the vapor pathway, to provide a reduced pressure therewithin to promote evaporation of the working fluid at a reduced temperature compared to the temperature required at ambient pressure, the first, second, and third vacuum barriers being multilayer laminate materials, and the thermal control unit includes a vapor control valve made from the first, second, and third vacuum barriers, a seal gasket, and a seal pin operable to control the rate of vapor flow between the evaporator and the sorber through the vapor pathway, the third vacuum barrier having a first end portion and a second end portion, the first end portion being in sealed engagement with the first vacuum barrier and the second end portion being in sealed engagement with the second vacuum barrier to define an internal barrier, the third vacuum barrier being positioned with the seal gasket to create a stable sealing surface, the seal pin protruding through the third vacuum barrier, but not through the first vacuum barrier or through the second vacuum barrier, the seal pin being located proximal to the seal gasket, and the seal pin being movable toward the sealing surface by atmospheric pressure.

16. The sorption heat pump of clause 15, wherein the thermal control unit further includes a gearmotor positioned outward of the first and second vacuum barriers and proximal to the seal pin, the gearmotor being operable to move the seal pin to at least one of at least partially opening the vapor control valve and at least partially closing the vapor control valve.

17. The sorption heat pump of clause 16, wherein the gearmotor is operable to move the seal pin by pushing on the seal pin and deforming at least one of the first, second, and third vacuum barriers, and closing the vapor control valve by not pushing on the seal pin.

18. The sorption heat pump of clause 16 or 17, wherein the gearmotor is controlled by a controller.

19. The sorption heat pump of any of clauses 1-18, further including a phase change material buffer positioned in thermal contact with the evaporator to create a heat pipe effect to distribute heat within the evaporator.

20. The sorption heat pump of any of clauses 1-19, wherein the vapor pathway has a cross sectional size between 0.01 and 10.0 square centimeters.

21. The sorption heat pump of any of clauses 1-20, wherein the vapor pathway has a cross sectional size between 0.1 and 5.0 square centimeters.

22. The sorption heat pump of any of clauses 1-21, wherein the vapor pathway has a maximum size in one dimension of between 0.01 and 2.0 centimeters.

23. The sorption heat pump of any of clauses 1-22, wherein the sorption material is zeolite, the working fluid is water, and the ratio of water to zeolite is 100-500 grams of water per kilogram of dry zeolite.

24. The sorption heat pump of any of clauses 1-23, wherein the sorption material is zeolite, the working fluid is water, and the ratio of water to zeolite is 150-350 grams of water per kilogram of dry zeolite.

25. The sorption heat pump of any of clauses 1-24, wherein the sorption material is zeolite, and the size of the zeolite granules is between 0.5 and 12.0 millimeters in diameter.

26. The sorption heat pump of any of clauses 1-25, wherein the sorption material is zeolite, and the size of the zeolite granules is between 1.5 and 8.0 millimeters in diameter.

27. The sorption heat pump of any of clauses 1-26, wherein the sorption material is zeolite, and the size of the zeolite granules is between 2.5 and 3.5 millimeters in diameter.

28. The sorption heat pump of any of clauses 1-27, further including a heater in thermal contact with the sorber to desorb the working fluid from the sorption material to produce the working fluid gas.

29. The sorption heat pump of any of clauses 1-28, wherein the sorber removably retains the sorption material therein and is structured to permit removal of sorbed sorption material and replacement with desorbed sorption material.

30. The sorption heat pump of clause 29, wherein the sorption material is contained inside a removable cartridge and the sorber has a cartridge receiver within which the cartridge is removably positionable, the cartridge retaining the sorption material therein as the sorber sorbs the working fluid gas during the sorption phase.

31. A sorption heat pump, comprising:
an evaporator containing a working fluid, and operable to evaporate the working fluid to produce a working fluid gas in the evaporator;
a sorber containing a sorption material to sorb the working fluid gas during a sorption phase;
a vapor pathway connecting the evaporator and the sorber; and
a thermal control unit positioned to control the rate of vapor flow between the evaporator and the sorber through the vapor pathway, and being selectively operable to permit the flow of working fluid gas through the vapor pathway, to next stop the flow of working fluid gas through the vapor pathway, and after stopping the flow to then permit resumption of the flow of working fluid gas through the vapor pathway.

32. A temperature controlled container for maintaining the temperature of a temperature sensitive material, comprising:
a sorption heat pump, comprising:
an evaporator structured to contain a working fluid, and operable to evaporate the working fluid to produce a working fluid gas in the evaporator;
a sorber structured to contain a sorption material to sorb the working fluid gas during a sorption phase;
a vapor pathway connecting the evaporator and the sorber; and
a thermal control unit positioned to control the rate of vapor flow between the evaporator and the sorber through the vapor pathway, and being selectively operable to permit the flow of working fluid gas through the vapor pathway, to next stop the flow of working fluid gas through the vapor pathway, and after stopping the flow to then permit resumption of the flow of working fluid gas through the vapor pathway; and
a compartment structured to store the temperature sensitive material, the evaporator being positioned inside the compartment and the sorber being positioned outside the compartment.

33. The temperature controlled container of clause 32, further including a phase change material buffer positioned inside the compartment in thermal contact with the evaporator to create a heat pipe effect to distribute heat within the evaporator.

34. The temperature controlled container of clause 33, wherein the compartment includes a compartment wall and the phase change material buffer between the evaporator and the compartment wall.

35. The temperature controlled container of clause 33 or 34, further including a heater in thermal contact with the evaporator, the heater being inside the compartment.

36. The temperature controlled container of any of clauses 32-35, further including a heater in thermal contact with the evaporator, the heater being inside the compartment.

37. The temperature controlled container of any of clauses 32-36, further including an insulation layer positioned about the compartment, the sorber being positioned outward of the insulation layer.

38. The temperature controlled container of clause 37, further including a phase change material buffer positioned inside the compartment in thermal contact with the evaporator to create a heat pipe effect to distribute heat within the evaporator.

39. The temperature controlled container of clause 38, further including a heater in thermal contact with the evaporator, the heater being inside the compartment.

40. The temperature controlled container of any of clauses 37-39, further including a heater in thermal contact with the evaporator, the heater being inside the compartment.

41. The sorption heat pump of any of clauses 32-40, further including a heater in thermal contact with the sorber to desorb the working fluid from the sorption material to produce the working fluid gas.

42. The sorption heat pump of any of clauses 32-41, further including a phase change material buffer in thermal contact with the sorber outside the compartment.

43. The temperature controlled container of any of clauses 32-42, wherein the sorber removably retains the sorption material therein and is structured to permit removal of sorbed sorption material and replacement with desorbed sorption material.

44. The temperature controlled container of clause 43, wherein the sorption material is contained inside a removable cartridge and the sorber has a cartridge receiver within which the cartridge is removably positionable, the cartridge retaining the sorption material therein as the sorber sorbs the working fluid gas during the sorption phase.

45. A temperature controlled container for maintaining the temperature of a temperature sensitive material, comprising:
a sorption heat pump, comprising:
an evaporator containing a working fluid, and operable to evaporate the working fluid to produce a working fluid gas in the evaporator;
a sorber containing a sorption material to sorb the working fluid gas during a sorption phase;
a vapor pathway connecting the evaporator and the sorber; and
a thermal control unit positioned to control the rate of vapor flow between the evaporator and the sorber through the vapor pathway, and being selectively operable to permit the flow of working fluid gas through the vapor pathway, to next stop the flow of working fluid gas through the vapor pathway, and after stopping the flow to then permit resumption of the flow of working fluid gas through the vapor pathway; and
a compartment structured to store the temperature sensitive material, the evaporator being positioned inside the compartment and the sorber being positioned outside the compartment.

46. A temperature controlled container for maintaining the temperature of a temperature sensitive material, comprising:
a sorption heat pump, comprising:
an evaporator structured to contain a working fluid, and operable to evaporate the working fluid to produce a working fluid gas in the evaporator;
a sorber structured to contain a sorption material to sorb the working fluid gas during a sorption phase;

a vapor pathway connecting the evaporator and the sorber; and a thermal control unit positioned to control the rate of vapor flow between the evaporator and the sorber through the vapor pathway, and being selectively operable to permit the flow of working fluid gas through the vapor pathway, to next stop the flow of working fluid gas through the vapor pathway, and after stopping the flow to then permit resumption of the flow of working fluid gas through the vapor pathway; and a compartment structured to store the temperature sensitive material, the sorber being positioned inside the compartment and the evaporator being positioned outside the compartment.

47. The temperature controlled container of clause 46, further including a phase change material buffer positioned inside the compartment in thermal contact with the sorber to regulate the temperature of the compartment.

48. The sorption heat pump of clause 46 or 47, further including a heater in thermal contact with the sorber to desorb the working fluid from the sorption material to produce the working fluid gas.

49. The temperature controlled container of any of clauses 46-48, further including an insulation layer positioned about the compartment, the evaporator being positioned outward of the insulation layer.

50. The temperature controlled container of clause 49, further including a phase change material buffer positioned inside the compartment in thermal contact with the sorber to regulate the temperature of the compartment.

51. The temperature controlled container of any of clauses 46-50, wherein the sorber removably retains the sorption material therein and is structured to permit removal of sorbed sorption material and replacement with desorbed sorption material.

52. The temperature controlled container of clause 51, wherein the sorption material is contained inside a removable cartridge and the sorber has a cartridge receiver within which the cartridge is removably positionable, the cartridge retaining the sorption material therein as the sorber sorbs the working fluid gas during the sorption phase.

53. A temperature controlled container for maintaining the temperature of a temperature sensitive material, comprising:
a sorption heat pump, comprising:
an evaporator containing a working fluid, and operable to evaporate the working fluid to produce a working fluid gas in the evaporator;
a sorber containing a sorption material to sorb the working fluid gas during a sorption phase;
a vapor pathway connecting the evaporator and the sorber; and
a thermal control unit positioned to control the rate of vapor flow between the evaporator and the sorber through the vapor pathway, and being selectively operable to permit the flow of working fluid gas through the vapor pathway, to next stop the flow of working fluid gas through the vapor pathway, and after stopping the flow to then permit resumption of the flow of working fluid gas through the vapor pathway; and a compartment structured to store the temperature sensitive material, the sorber being positioned inside the compartment and the evaporator being positioned outside the compartment.

54. A temperature controlled apparatus, comprising:
a sorption heat pump, comprising:

an evaporator structured to contain a working fluid, and operable to evaporate the working fluid to produce a working fluid gas in the evaporator;
a sorber structured to contain a sorption material to sorb the working fluid gas during a sorption phase;
a vapor pathway connecting the evaporator and the sorber; and
a thermal control unit positioned to control the rate of vapor flow between the evaporator and the sorber through the vapor pathway, and being selectively operable to permit the flow of working fluid gas through the vapor pathway, to next stop the flow of working fluid gas through the vapor pathway, and after stopping the flow to then permit resumption of the flow of working fluid gas through the vapor pathway;
a cool compartment, the evaporator being positioned inside the cool compartment;
a warm compartment, the sorber being positioned inside the warm compartment;
a cool compartment insulation layer positioned about the cool compartment and the evaporator, the warm compartment and the sorber being positioned outward of the cool compartment insulation layer; and
a warm compartment insulation layer positioned about the warm compartment and the sorber, the cool compartment and the evaporator being positioned outward of the warm compartment insulation layer.

55. The temperature controlled unit of clause 54, further including a phase change material buffer positioned in thermal contact with the evaporator.

56. The temperature controlled unit of clause 54 or 55, further including a sorber phase change material buffer positioned in thermal contact with the sorber.

57. The temperature controlled unit of clause 56, further including an evaporator phase change material buffer positioned in thermal contact with the evaporator.

58. The temperature controlled unit of any of clauses 54-57, further including a heater in thermal contact with the sorber to desorb the working fluid from the sorption material to produce the working fluid gas.

59. The temperature controlled unit of any of clauses 54-58, wherein the sorber removably retains the sorption material therein and is structured to permit removal of sorbed sorption material and replacement with desorbed sorption material.

60. The temperature controlled unit of clause 59, wherein the sorption material is contained inside a removable cartridge and the sorber has a cartridge receiver within which the cartridge is removably positionable, the cartridge retaining the sorption material therein as the sorber sorbs the working fluid gas during the sorption phase.

61. A temperature controlled apparatus, comprising:
a sorption heat pump, comprising:
an evaporator containing a working fluid, and operable to evaporate the working fluid to produce a working fluid gas in the evaporator;
a sorber containing a sorption material to sorb the working fluid gas during a sorption phase;
a vapor pathway connecting the evaporator and the sorber; and
a thermal control unit positioned to control the rate of vapor flow between the evaporator and the sorber through the vapor pathway, and being selectively operable to permit the flow of working fluid gas through the vapor pathway, to next stop the flow of working fluid gas through the vapor pathway, and after stopping the flow to then permit resumption of the flow of working fluid gas through the vapor pathway;

a cool compartment, the evaporator being positioned inside the cool compartment;

a warm compartment, the sorber being positioned inside the warm compartment;

a cool compartment insulation layer positioned about the cool compartment and the evaporator, the warm compartment and the sorber being positioned outward of the cool compartment insulation layer; and a warm compartment insulation layer positioned about the warm compartment and the sorber, the cool compartment and the evaporator being positioned outward of the warm compartment insulation layer.

62. A method for reusing a sorption heat pump having an evaporator containing a working fluid, the working fluid evaporating to a working fluid gas in the evaporator, sorber containing a sorption material to sorb the working fluid gas during a sorption phase, a vapor pathway connecting the evaporator and the sorber, and a thermal control unit positioned to control the rate of vapor flow between the evaporator and the sorber through the vapor pathway comprising:

providing the sorption heat pump to a user;

after the user has operated the sorption heat pump to at least partially sorb the sorption material in the sorber, receiving back the sorption heat pump;

reconditioning the sorption heat pump; and providing the reconditioned sorption heat pump to the user or another user.

63. The method of clause 62 where the sorption material is removable from the sorber, wherein the step of reconditioning the sorption heat pump is accomplished by removal of the at least partially sorbed sorption material from the sorber, and then placing at least substantially desorbed sorption material in the sorber.

64. The method of clause 62 or 63 where the sorption material is contained inside a removable cartridge and the sorber has a cartridge receiver within which the cartridge is removably positionable, the cartridge retaining the sorption material therein as the sorber sorbs the working fluid gas during the sorption phase, wherein the step of reconditioning the sorption material is accomplished by removal of the cartridge with the at least partially sorbed sorption material from the cartridge receiver, and then positioning a cartridge with at least substantially desorbed sorption material in the cartridge receiver.

65. A method for reusing a temperature controlled container having a sorption heat pump and a compartment for storing a temperature sensitive material, the sorption heat pump having an evaporator containing a working fluid, the working fluid evaporating to a working fluid gas in the evaporator, a sorber containing a sorption material to sorb the working fluid gas during a sorption phase, a vapor pathway connecting the evaporator and the sorber, and a thermal control unit positioned to control the rate of vapor flow between the evaporator and the sorber through the vapor pathway, comprising:

providing the temperature controlled container to a user ready for use by the user;

after the user has operated the sorption heat pump to at least partially sorb the sorption material in the sorber, receiving back the temperature-controlled container with the at least partially sorbed sorption material;

reconditioning the sorption heat pump; and providing the temperature controlled container with the reconditioned sorption heat pump to the user or another user.

66. The method of clause 65 where the sorption material is removable from the sorber, wherein the step of reconditioning the sorption heat pump is accomplished by removal of the at least partially sorbed sorption material from the sorber, and then placing at least substantially desorbed sorption material in the sorber.

67. The method of clause 65 or 66 where the sorption material is contained inside a removable cartridge and the sorber has a cartridge receiver within which the cartridge is removably positionable, the cartridge retaining the sorption material therein as the sorber sorbs the working fluid gas during the sorption phase, wherein the step of recharging the sorption material is accomplished by removal of the cartridge with the at least partially sorbed sorption material from the cartridge receiver, and then positioning a cartridge with at least substantially desorbed sorption material in the cartridge receiver.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

What is claimed is:

1. A temperature controlled container for maintaining the temperature of a temperature sensitive material, comprising:
a sorption heat pump, comprising:
an evaporator containing a working fluid, and operable to evaporate the working fluid to produce a working fluid gas in the evaporator;
a sorber containing a sorption material to sorb the working fluid gas during a sorption phase;
a vapor pathway connecting the evaporator and the sorber; and
a valve positioned to control the rate of vapor flow between the evaporator and the sorber through the vapor pathway, and being selectively operable to permit the flow of working fluid gas through the vapor pathway, to next stop the flow of working fluid gas through the vapor pathway, and after stopping the flow to then permit resumption of the flow of working fluid gas through the vapor pathway;
a compartment structured to store the temperature sensitive material, the evaporator being positioned inside the compartment and the sorber being positioned outside the compartment; and
a phase change material buffer positioned inside the compartment in thermal contact with the evaporator to create a heat pipe effect to distribute heat within the evaporator.

2. A temperature controlled container for maintaining the temperature of a temperature sensitive material, comprising:
a sorption heat pump, comprising:
an evaporator containing a working fluid, and operable to evaporate the working fluid to produce a working fluid gas in the evaporator;
a sorber containing a sorption material to sorb the working fluid gas during a sorption phase;
a vapor pathway connecting the evaporator and the sorber; and
a valve positioned to control the rate of vapor flow between the evaporator and the sorber through the vapor pathway, and being selectively operable to permit the flow of working fluid gas through the vapor pathway, to next stop the flow of working fluid gas through the vapor pathway, and after stopping the flow to then permit resumption of the flow of working fluid gas through the vapor pathway; and
a compartment structured to store the temperature sensitive material, the sorber being positioned inside the compartment and the evaporator being positioned outside the compartment.

3. A temperature controlled apparatus, comprising:
a sorption heat pump, comprising:
an evaporator containing a working fluid, and operable to evaporate the working fluid to produce a working fluid gas in the evaporator;
a sorber containing a sorption material to sorb the working fluid gas during a sorption phase;

a valve positioned to control the rate of vapor flow between the evaporator and the sorber through the vapor pathway, and being selectively operable to permit the flow of working fluid gas through the vapor pathway, to next stop the flow of working fluid gas through the vapor pathway, and after stopping the flow to then permit resumption of the flow of working fluid gas through the vapor pathway;
a cool compartment, the evaporator being positioned inside the cool compartment;
a warm compartment, the sorber being positioned inside the warm compartment; and
a cool compartment insulation layer positioned about the cool compartment and the evaporator, the warm compartment and the sorber being positioned outward of the cool compartment insulation layer; and
a warm compartment insulation layer positioned about the warm compartment and the sorber, the cool compartment and the evaporator being positioned outward of the warm compartment insulation layer.

4. A temperature controlled apparatus, comprising:
a sorption heat pump, comprising:
an evaporator structured to contain a working fluid, and operable to evaporate the working fluid to produce a working fluid gas in the evaporator;
a sorber structured to contain a sorption material to sorb the working fluid gas during a sorption phase;
a vapor pathway connecting the evaporator and the sorber; and
a valve positioned to control the rate of vapor flow between the evaporator and the sorber through the vapor pathway, and being selectively operable to permit the flow of working fluid gas through the vapor pathway, to next stop the flow of working fluid gas through the vapor pathway, and after stopping the flow to then permit resumption of the flow of working fluid gas through the vapor pathway;
a cool compartment, the evaporator being positioned inside the cool compartment;
a warm compartment, the sorber being positioned inside the warm compartment; and
a cool compartment insulation layer positioned about the cool compartment and the evaporator, the warm compartment and the sorber being positioned outward of the cool compartment insulation layer.

5. A temperature controlled container for maintaining the temperature of a temperature sensitive material, comprising:
a sorption heat pump, comprising:
an evaporator structured to contain a working fluid, and operable to evaporate the working fluid to produce a working fluid gas in the evaporator:
a sorber structured to contain a sorption material to sorb the working fluid gas during a sorption phase;
a vapor pathway connecting the evaporator and the sorber; and
a valve positioned to control the rate of vapor flow between the evaporator and the sorber through the vapor pathway, and being selectively operable to permit the flow of working fluid gas through the vapor pathway, to next stop the flow of working fluid gas through the vapor pathway, and after stopping the flow to then permit resumption of the flow of working fluid gas through the vapor pathway;
a compartment structured to store the temperature sensitive material, the evaporator being positioned inside the compartment and the sorber being positioned outside the compartment; and a phase change material buffer positioned inside the compartment in thermal contact with the evaporator to create a heat pipe effect to distribute heat within the evaporator.

6. The temperature controlled container of claim 5, wherein the compartment includes a compartment wall and the phase change material buffer between the evaporator and the compartment wall.

7. The temperature controlled container of claim 5, further including a heater in thermal contact with the evaporator, the heater being inside the compartment.

8. The temperature controlled container of claim 5, further including a heater in thermal contact with the sorber to desorb the working fluid from the sorption material to produce the working fluid gas.

9. The temperature controlled container of claim 5, further including a phase change material buffer in thermal contact with the sorber outside the compartment.

10. The temperature controlled container of claim 5, further including an insulation layer positioned about the compartment, the sorber being positioned outward of the insulation layer.

11. The temperature controlled container of claim 10, further including a heater in thermal contact with the evaporator, the heater being inside the compartment.

12. The temperature controlled container of claim 5, wherein the sorber removably retains the sorption material therein and is structured to permit removal of sorbed sorption material and replacement with desorbed sorption material.

13. The temperature controlled container of claim 12, wherein the sorption material is contained inside a removable cartridge and the sorber has a cartridge receiver within which the cartridge is removably positionable, the cartridge retaining the sorption material therein as the sorber sorbs the working fluid gas during the sorption phase.

14. A temperature controlled container for maintaining the temperature of a temperature sensitive material, comprising:
 a sorption heat pump, comprising:
  an evaporator structured to contain a working fluid, and operable to evaporate the working fluid to produce a working fluid gas in the evaporator;
  a sorber structured to contain a sorption material to sorb the working fluid gas during a sorption phase;
  a vapor pathway connecting the evaporator and the sorber; and
  a valve positioned to control the rate of vapor flow between the evaporator and the sorber through the vapor pathway, and being selectively operable to permit the flow of working fluid gas through the vapor pathway, to next stop the flow of working fluid gas through the vapor pathway, and after stopping the flow to then permit resumption of the flow of working fluid gas through the vapor pathway; and
 a compartment structured to store the temperature sensitive material, the sorber being positioned inside the compartment and the evaporator being positioned outside the compartment.

15. The temperature controlled container of claim 14, further including a phase change material buffer positioned inside the compartment in thermal contact with the sorber to regulate the temperature of the compartment.

16. The sorption heat pump of claim 14, further including a heater in thermal contact with the sorber to desorb the working fluid from the sorption material to produce the working fluid gas.

17. The temperature controlled container of claim 14, further including an insulation layer positioned about the compartment, the evaporator being positioned outward of the insulation layer.

18. The temperature controlled container of claim 17, further including a phase change material buffer positioned inside the compartment in thermal contact with the sorber to regulate the temperature of the compartment.

19. The temperature controlled container of claim 14, wherein the sorber removably retains the sorption material therein and is structured to permit removal of sorbed sorption material and replacement with desorbed sorption material.

20. The temperature controlled container of claim 19, wherein the sorption material is contained inside a removable cartridge and the sorber has a cartridge receiver within which the cartridge is removably positionable, the cartridge retaining the sorption material therein as the sorber sorbs the working fluid gas during the sorption phase.

21. A temperature controlled apparatus, comprising:
 a sorption heat pump, comprising:
  an evaporator structured to contain a working fluid, and operable to evaporate the working fluid to produce a working fluid gas in the evaporator;
  a sorber structured to contain a sorption material to sorb the working fluid gas during a sorption phase;
  a vapor pathway connecting the evaporator and the sorber; and
  a valve positioned to control the rate of vapor flow between the evaporator and the sorber through the vapor pathway, and being selectively operable to permit the flow of working fluid gas through the vapor pathway, to next stop the flow of working fluid gas through the vapor pathway, and after stopping the flow to then permit resumption of the flow of working fluid gas through the vapor pathway;
 a cool compartment, the evaporator being positioned inside the cool compartment;
 a warm compartment, the sorber being positioned inside the warm compartment;
 a cool compartment insulation layer positioned about the cool compartment and the evaporator, the warm compartment and the sorber being positioned outward of the cool compartment insulation layer; and
 a warm compartment insulation layer positioned about the warm compartment and the sorber, the cool compartment and the evaporator being positioned outward of the warm compartment insulation layer.

22. The temperature controlled unit of claim 21, further including a phase change material buffer positioned in thermal contact with the evaporator.

23. The temperature controlled unit of claim 21, further including a heater in thermal contact with the sorber to desorb the working fluid from the sorption material to produce the working fluid gas.

24. The temperature controlled unit of claim 21, further including a sorber phase change material buffer positioned in thermal contact with the sorber.

25. The temperature controlled unit of claim 24, further including an evaporator phase change material buffer positioned in thermal contact with the evaporator.

26. The temperature controlled unit of claim 21, wherein the sorber removably retains the sorption material therein and is structured to permit removal of sorbed sorption material and replacement with desorbed sorption material.

27. The temperature controlled unit of claim 26, wherein the sorption material is contained inside a removable cartridge and the sorber has a cartridge receiver within which the cartridge is removably positionable, the cartridge retaining the sorption material therein as the sorber sorbs the working fluid gas during the sorption phase.

* * * * *